(12) United States Patent
An et al.

(10) Patent No.: US 12,182,917 B2
(45) Date of Patent: Dec. 31, 2024

(54) ELECTRONIC DEVICE AND METHOD FOR GENERATING USER AVATAR-BASED EMOJI STICKER

(71) Applicant: SAMSUNG ELECTRONICS CO., LTD., Suwon-si (KR)

(72) Inventors: Junho An, Suwon-si (KR); Hyejin Kang, Suwon-si (KR); Jiyoon Park, Suwon-si (KR); Changsub Bae, Suwon-si (KR); Sangkyun Seo, Suwon-si (KR); Jaeyun Song, Suwon-si (KR); Minsheok Choi, Suwon-si (KR); Gyuhee Han, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 212 days.

(21) Appl. No.: 18/070,944

(22) Filed: Nov. 29, 2022

(65) Prior Publication Data

US 2023/0087879 A1 Mar. 23, 2023

Related U.S. Application Data

(63) Continuation of application No. PCT/KR2021/006543, filed on May 26, 2021.

(30) Foreign Application Priority Data

May 29, 2020 (KR) .......................... 10-2020-0065208

(51) Int. Cl.
*G06T 13/00* (2011.01)
*G06T 7/246* (2017.01)
(Continued)

(52) U.S. Cl.
CPC .............. *G06T 13/00* (2013.01); *G06T 7/246* (2017.01); *G06V 40/28* (2022.01); *H04N 5/272* (2013.01);
(Continued)

(58) Field of Classification Search
CPC ......... G06T 13/00; G06T 13/40; G06T 13/20; G06T 13/80; G06T 7/246; G06T 2200/24;
(Continued)

(56) References Cited

U.S. PATENT DOCUMENTS 9,684,430 B1 * 6/2017 Perigault ............... G06F 3/0237
9,830,728 B2 11/2017 Fang et al.
(Continued)

FOREIGN PATENT DOCUMENTS

CN 107430429 A 12/2017
EP 3404659 A1 * 11/2018 ............... G06F 3/01
(Continued)

OTHER PUBLICATIONS

European Search Report Issued In EP Application No. 21812977.3-1208, Mail Dated Jan. 19, 2024, 19 Pages.
(Continued)

*Primary Examiner* — Said Broome
*Assistant Examiner* — Donna J. Ricks
(74) *Attorney, Agent, or Firm* — CANTOR COLBURN LLP

(57) ABSTRACT

An electronic device includes a camera, a display, and a processor. The processor displays a user interface including menu items supporting entry into an edit mode for a body part of an emoji displayed on the display. The processor captures a user face image using the camera, upon a user requesting facial expression edit mode from the interface. The processor generates a facial expression motion file from the user face image. The processor captures a user body image using the camera upon the user requesting body motion edit mode. The processor generates a body motion file from the user body image. The processor adjusts sync for combining the generated facial expression motion file and body motion file. The processor generates a customized
(Continued)

emoji sticker on which user facial expression and body movement are reflected by combining the sync-adjusted facial expression motion file and body motion file.

15 Claims, 19 Drawing Sheets

(51) Int. Cl.
  *G06V 40/20* (2022.01)
  *H04N 5/272* (2006.01)
  *H04N 23/63* (2023.01)
  *H04N 23/667* (2023.01)
(52) U.S. Cl.
  CPC ......... *H04N 23/632* (2023.01); *H04N 23/667* (2023.01); *G06T 2200/24* (2013.01); *G06T 2207/30201* (2013.01); *H04N 2005/2726* (2013.01)
(58) Field of Classification Search
  CPC ....... G06T 2207/30201; G06T 2215/16; G06T 11/60; G06T 2213/00; A63F 13/655; A63F 2300/5553; A63F 13/87; A63F 13/92
  See application file for complete search history.

(56) References Cited

U.S. PATENT DOCUMENTS

| | | | |
|---|---|---|---|
| 10,019,825 | B2 | 7/2018 | Li et al. |
| 10,210,648 | B2 | 2/2019 | Stoyles et al. |
| 10,362,219 | B2 | 7/2019 | Wilson et al. |
| 10,430,642 | B2 | 10/2019 | Bouaziz et al. |
| 2012/0169740 | A1 | 7/2012 | Han et al. |
| 2013/0235045 | A1 | 9/2013 | Corazza et al. |
| 2015/0287403 | A1* | 10/2015 | Holzer Zaslansky ....................... G06T 13/205 704/231 |
| 2016/0328874 | A1 | 11/2016 | Tong et al. |
| 2017/0046065 | A1 | 2/2017 | Zeng et al. |
| 2017/0140214 | A1 | 5/2017 | Matas et al. |
| 2018/0047200 | A1 | 2/2018 | O'Hara et al. |
| 2018/0101135 | A1* | 4/2018 | Rinker .................. G06T 13/205 |
| 2018/0335927 | A1 | 11/2018 | Anzures et al. |
| 2019/0088018 | A1 | 3/2019 | Shenton et al. |
| 2019/0126152 | A1 | 5/2019 | Taylor et al. |
| 2019/0251728 | A1 | 8/2019 | Stoyles et al. |
| 2019/0260702 | A1 | 8/2019 | Hall |
| 2019/0266807 | A1 | 8/2019 | Lee et al. |
| 2019/0287287 | A1 | 9/2019 | Bondich et al. |
| 2019/0320144 | A1 | 10/2019 | Tong et al. |
| 2020/0074711 | A1 | 3/2020 | Barlier et al. |
| 2020/0077157 | A1 | 3/2020 | Kurabuchi |
| 2020/0250874 | A1 | 8/2020 | Assouline et al. |
| 2020/0265234 | A1 | 8/2020 | Lee et al. |
| 2020/0358725 | A1* | 11/2020 | Scapel ................ G06F 3/04817 |
| 2020/0402304 | A1 | 12/2020 | Hwang et al. |
| 2022/0070385 | A1* | 3/2022 | Van Os ............ H04M 1/72439 |

FOREIGN PATENT DOCUMENTS

| | | | | |
|---|---|---|---|---|
| JP | 2007104540 | A | 4/2007 | |
| JP | 2019211828 | A | 12/2019 | |
| JP | 2020036303 | A | 3/2020 | |
| KR | 20130032620 | A | 4/2013 | |
| KR | 101553846 | B1 | 9/2015 | |
| KR | 20180080783 | A | 7/2018 | |
| KR | 20190101832 | A | 9/2019 | |
| KR | 20190101835 | A | 9/2019 | |
| KR | 20190139962 | A | 12/2019 | |
| KR | 20200101206 | A | 8/2020 | |
| WO | WO-2017153771 | A1 * | 9/2017 | ............ A63F 13/211 |
| WO | WO-2020054945 | A1 * | 3/2020 | ............ B25J 11/001 |

OTHER PUBLICATIONS

Koh Jung in Jungin@Tamu Edu et al: "Developing a Hand Gesture Recognition System for Mapping Symbolic Hand Gestures to Analogous Emojis in Computer-Mediated Communication", ACM Transactions On Interactive Intelligent Systems (TIIS), ACM, 2 Penn Plaza, Suite 701 New York NY 10121-0701 USA, vol. 9, No. 1, Mar. 1, 2019 (Mar. 1, 2019), pp. 1-35, XP058679340, ISSN: 2160-6455, 001: 10.1145/3297277.

Liu Miki Mikiannliu@Gmail Com et al: "ReactionBot", Proceedings of the ACM On Human-Computer Interaction, ACMPUB27, New York, NY, USA, vol. 2, No. CSCW, Nov. 1, 2018 (Nov. 1, 2018), pp. 1-16, XP058486933, DOI: 10.1145/3274379.

International Search Report and Written Opinion for International Application No. PCT/KR2021/006543; International Filing Date May 26, 2021; Date of Mailing Sep. 13, 2021; 64 Pages.

Georgescu Mariana-Iuliana et al:Recognizing Facial Expressions of OccludedFaces Using Convolutional Neural Networks: 26thInternational Conference, ICONIP 2019, Sydney, NSW, Australia, Dec. 12-15, 2019,Proceedings, Part IV.

Partial European Search Report dated Sep. 25, 2023 from the European Patent Office.

* cited by examiner

<8002>

<9003>

ELECTRONIC DEVICE AND METHOD FOR GENERATING USER AVATAR-BASED EMOJI STICKER

CROSS-REFERENCE TO RELATED APPLICATION(S)

This application is a continuation application, claiming priority under § 365(c), of an International Application No. PCT/KR2021/006543, filed on May 26, 2021, which is based on and claims the benefit of a Korean patent application number 10-2020-0065208, filed on May 29, 2020, in the Korean Intellectual Property Office, the disclosure of which is incorporated by reference herein in its entirety.

TECHNICAL FIELD

Various embodiments relate to an electronic device and a method of generating a user avatar-based emoji sticker in the electronic device.

BACKGROUND ART

Electronic devices may generate an avatar resembling a user using a user image. Electronic devices may utilize the user avatar to provide the user with various services, for example, avatar shooting or an emoji sticker (or animation sticker) that allows the user to directly or indirectly express emotions of the user by applying facial expressions, gestures, or text to the user avatar.

DISCLOSURE OF INVENTION

Technical Problem

An electronic device may provide a function of generating an avatar resembling a user and utilizing the same and generating emoji stickers, for example, based on a predefined model or template. However, since the emoji stickers are provided by the electronic device utilizing models or templates produced in advance by a graphic designer, the number of available emoji stickers is limited, and use thereof is limited to the models provided by a service provider. For this reason, in providing an emoji sticker service to the user, it is difficult to accurately reflect the unique and individual features of the user, such as facial expressions and body motions desired by the user.

According to various embodiments, the electronic device may support a service of generating a customized emoji sticker for a user by reflecting a facial expression and a body motion desired by the user in addition to a specified facial expression or body motion.

Solution to Problem

In accordance with an aspect of the disclosure, an electronic device is provided. An electronic device comprises a camera, a display, a processor operably connected to the camera and the display, and a memory operably connected to the processor, wherein the memory may store instructions which, when executed, enable the processor to: display menu items supporting entry into an edit mode for each body part by including same in at least a part of an emoji function user interface displayed on the display, when an emoji function is executed; capture a user face image by activating the camera, on the basis of a user input requesting entry into a facial expression edit mode from the emoji function user interface; generate a facial expression motion file from the user face image; capture a user body image by activating the camera, on the basis of a user input requesting entry into a body motion edit mode from the emoji function user interface; generate a body motion file from the user body image; adjust sync for combining the generated facial expression motion file and body motion file; and generate a customized emoji sticker on which user facial expression and body movement are reflected by combining the sync-adjusted facial expression motion file and body motion file.

In accordance with another aspect of the disclosure, a method for generating an emoji in an electronic device, the method comprising in case that an emoji function is executed in the electronic device, displaying an emoji function user interface supporting entry into an edit mode for each body part on a display, receiving a user input requesting entry into a facial expression edit mode in the emoji function user interface, activating a camera in the facial expression edit mode to capture a user face image and generating a facial expression motion file from the user face image, performing control to display a customized facial expression emoji corresponding to the generated facial expression file on the emoji function user interface, receiving a user input requesting entry into a body motion edit mode in the emoji function user interface, activating the camera in the body motion edit mode to capture a user body image and generating a body motion file from the user body image, performing control to display a customized body motion emoji corresponding to the generated body motion file on the emoji function user interface; and performing control to generate a customized emoji sticker reflecting a user facial expression and a body motion, based on a user input requesting a combination of the customized facial expression emoji and the customized body motion emoji and update the emoji function with the same.

Advantageous of Invention

According to various embodiments, the electronic device may extract a facial expression, body motion, or hand motion desired by a user using a camera or a user image instead of using a predetermined graphic tool when generating an emoji sticker and may store the same as respective animation files.

According to various embodiments, the electronic device may extract a message matching the body motion or hand motion recognized by photographing the user and use the extracted message to produce an emoji sticker, thereby producing an emoji sticker that enables the user to more clearly convey the emotion.

According to various embodiments, the electronic device may directly produce an emoji sticker that resembles the facial expression desired by the user and the 'user's motion features and use the same as a sticker format, thereby increasing the satisfaction of using user avatar-based emojis and improving the usability thereof.

MODE FOR THE INVENTION

Figure 1:
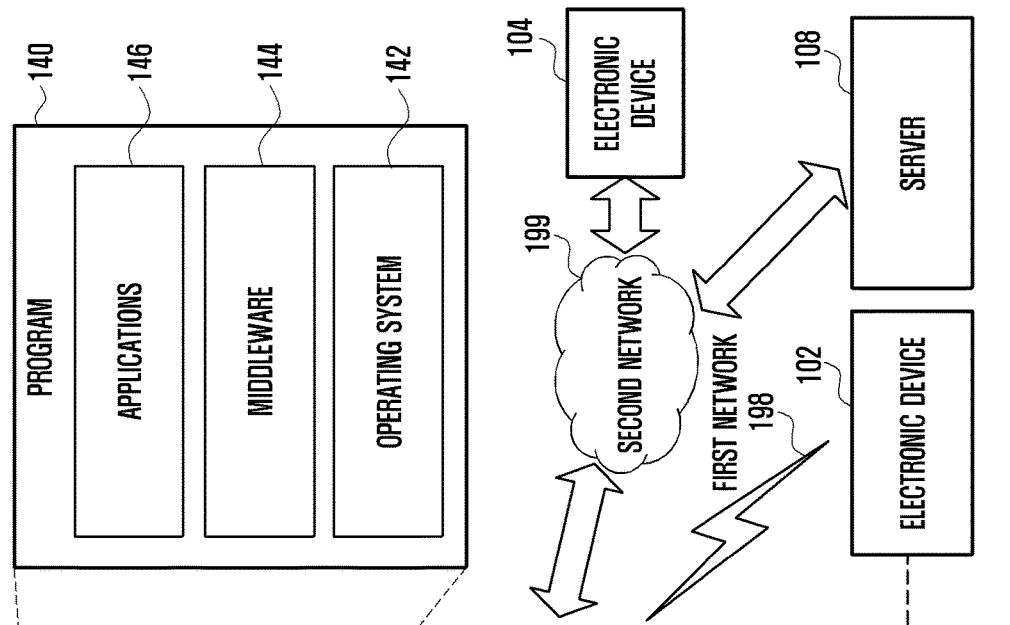
FIG. 1 is a block diagram illustrating an electronic device 101 in a network environment 100 according to various embodiments.
Figure 1:
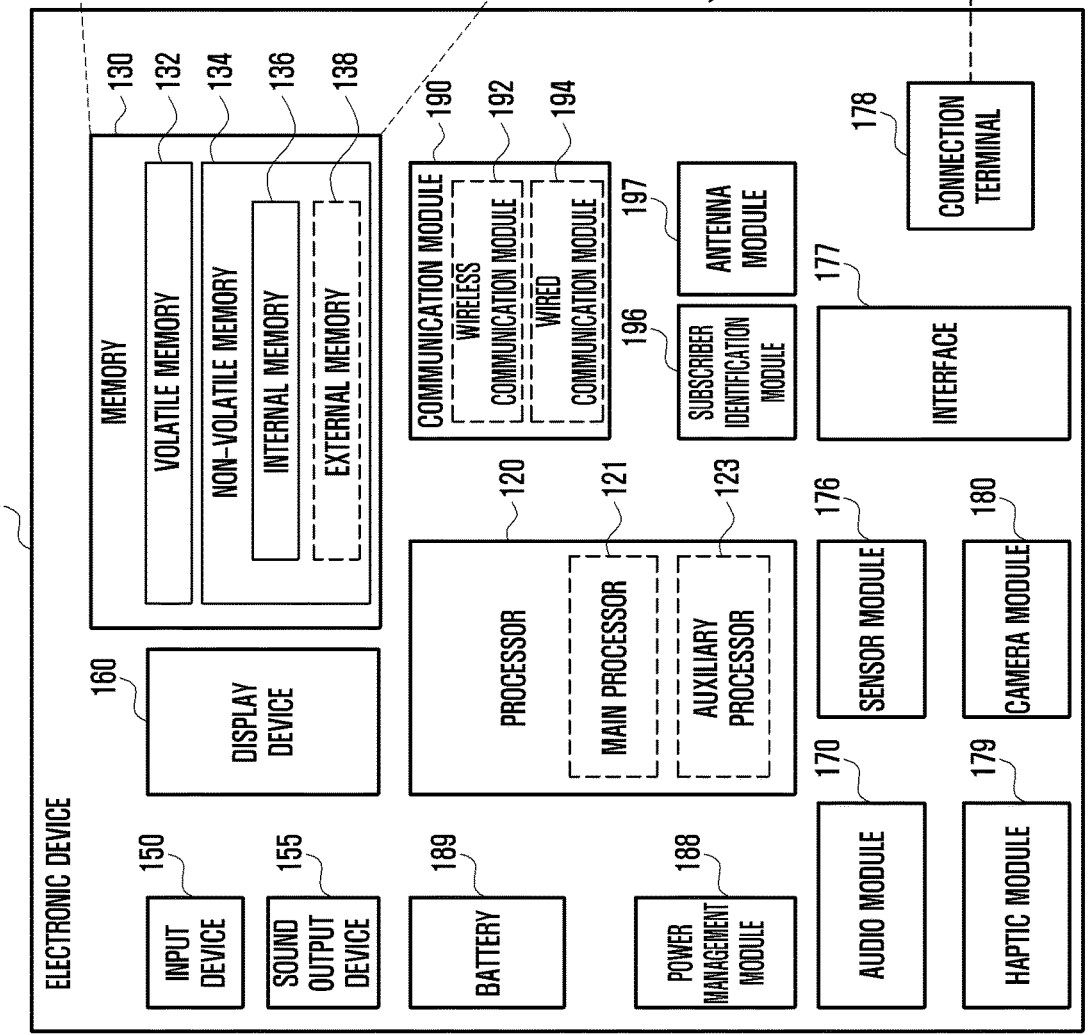

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
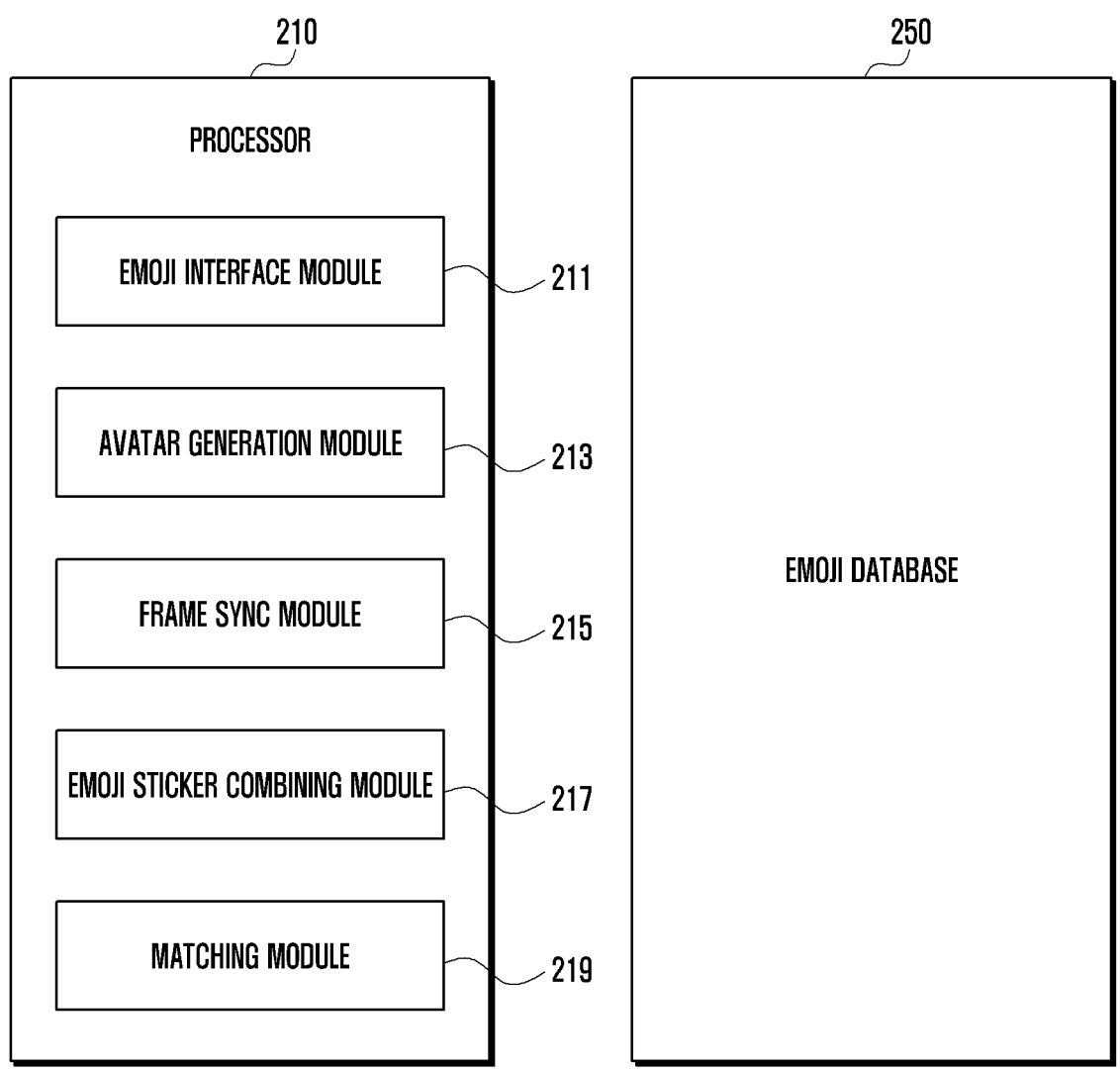
FIG. 2 is a block diagram of an electronic device according to various embodiments.

FIG. 2 is a block diagram of an electronic device according to various embodiments.

Referring to FIG. 2, an electronic device (e.g., the electronic device 101 in FIG. 1), according to an embodiment, may include a processor 210 (e.g., the processor 120 in FIG. 1). The electronic device 101 may further include at least some of the configurations and/or functions of the electronic device 101 in FIG. 1 and include the same elements shown in FIG. 1.

According to an embodiment, the electronic device 101 may provide at least one of a function of recognizing a subject (e.g., a user) from an image (e.g., a still image or video), a function of generating an avatar reflecting the subject, a function of applying an avatar on behalf of the subject (e.g., displaying an avatar by replacing the user's face), a function of changing a two-dimensional avatar into a three-dimensional avatar, a function of synchronizing the frame sync (i.e., synchronization) between a facial expression motion and a body motion, a function of generating an emoji/animated sticker, a function of recognizing a message that matches a body motion, and a function of generating a sign language emoji. The above functions may be provided through an emoji application or an augmented reality application. Alternatively, the functions may be provided as one of the functions (e.g., app in app) provided by a camera application.

According to an embodiment, the processor 210 may include an emoji interface module 211, an emoji generation module 213, a frame sync module 215, an emoji sticker combining module 217, and a matching module 219. The modules 211, 213, 215, 217, and 219 may be configured as hardware modules of the processor 210 (e.g., an application processor or an image processing processor). At least one of the modules 211, 213, 215, 217, and 219 may be configured as separate hardware different from the processor in the electronic device. Alternatively, the modules 211, 213, 215, 217, and 219 may be implemented as software (e.g., programs 140), and the processor 210 may execute the software.

The emoji interface module 211 may provide a display device 160 (e.g., a display or a touch screen) with a user interface environment to support a function related to emojis (e.g., augmented reality (AR) avatars). The emoji interface module 211 may display an item (e.g., an app icon or a menu icon) for entry into an emoji home mode (e.g., an emoji home screen or an emoji showroom mode) on at least a portion of a home screen or application execution screen (e.g., a camera mode screen).

The emoji home mode may support a showroom function for displaying emojis, a function for the avatar to perform animations (e.g., a greeting gesture), a function for editing avatars, a function for editing a background, a function for generating an emoji/animation sticker, based on the avatar, a function for editing the emoji/animation sticker, or a sharing function with other tools or third party applications (e.g., sharing avatars with other applications).

The emoji interface module 211 may display various screens for performing emoji-related functions on the display, based on a user input for performing emoji-related functions. The emoji interface module 211, in response to entering an emoji camera mode, may display an image obtained from the camera (e.g., the camera module 180 in FIG. 1), as a preview image, on the display.

The emoji interface module 211 may independently apply and reflect at least one of a facial expression motion and a body motion, which are specified in a user input, to an emoji/animation sticker.

The emoji generation module 213 may generate an avatar reflecting the features of the user. The emoji generation module 213 may process and manage data for each part of the avatar. For example, the emoji generation module 213 may include a module for processing/storing a facial expression motion, a module for processing/storing a body motion, and a module for processing/storing backgrounds and effects. The modules may operate integrally or individually.

The emoji generation module 213 may analyze movements of a subject (e.g., the user) from an image (e.g., a preview image or a stored image) obtained in the emoji camera mode and extract at least one of characteristic facial expression motion and body motion (or hand motion). For example, the emoji generation module 213 may recognize a change in the user's facial expression (e.g., a motion of blinking eyes) and a change in the user's body motion (e.g., a moving the head or an opening and closing the palm), based on the preview image.

The emoji generation module 213 may store an extracted facial expression motion file (e.g., a json file) or body motion file (e.g., a bvh file) as each animation file and add the same to an emoji list in each edit mode. For example, the emoji interface module 211 may add a customized facial expression motion emoji produced according to a user request, as well as a facial expression set format configured or specified in a facial expression emoji edit mode, to a facial expression emoji list, and display the same.

The frame sync module 215 may adjust the sync of each motion file to synthesize the facial expression motion file (e.g., a json file) and the body motion file (e.g., a bvh file). The frame sync module 215 may adjust the number of frames of each file so as to match the sync between the respective motion files. The frame sync module 215 may adjust the number of times motions are automatically repeated and a combination ratio of each motion when generating an emoji sticker.

The frame sync module 215 may calculate the number of frames necessary for the reproduction of an animation from the respective motion files (or motion data) generated to have different frame numbers, and calculate a reference frame (or important frame or highlight frame) for frame mixing. The frame sync module 215 may dispose the reference frame as an essential configuration and adjust the number of frames such that the motion data has the same length value. The frame sync module 215 may adjust the number of frames in each motion data differently to adjust a value repeatedly reproduced for each motion data. The frame sync module 215 may remove an unnecessarily bouncing motion value when reproducing the animation, based on each motion data, to adjust the animation to be smoothly reproduced.

According to various embodiments, the frame sync module 215 may support a function of correcting respective frames by inserting a background image between frames or inserting additional text or an icon into a specific frame based on the frames of the emoji sticker.

The emoji sticker combining module 217 may combine an emoji facial expression motion and a body motion transmitted from the frame sync module 215, thereby generating an emoji/animation sticker. The emoji sticker combining module 217 may combine the user avatar with the generated emoji sticker. For example, the emoji sticker combining module 217 may support an application of an emoji to the user avatar for each body part and change thereof. The emoji sticker combining module 217 may support changing emojis and/or emoji items (e.g., eyes, nose, mouth, hair color, hairstyle, face shape, skin color, clothes, and/or accessories). The emoji sticker combining module 217 may support changing the background image, effect, or message of the emoji. If an emoji or an emoji item is changed, the emoji sticker combining module 217 may update the items of the emoji sticker, stored in relation to the emoji, to reflect the same.

The matching module 219 may determine whether or not a message or text matching a body motion of a subject recognized by the emoji generation module is recognized. If a message or text matching motion features of the body motion are recognized, the matching module 219 may transmit a message or text information to the emoji sticker combining module 217. The emoji sticker combining module 217, based on the specific body motion in which the matching text or message is recognized, may insert the matching text or message into the background image when generating the emoji sticker, thereby generating the emoji sticker.

Alternatively, the matching module 219 may transmit body motion data extracted from a user image to an emoji server through a communication module (e.g., the communication module 190 in FIG. 1) and receive a message or text information corresponding to the body motion data from the emoji server.

Additionally or optionally, the matching module 219 may be excluded.

An emoji database 250 may include at least one of a set of predefined or configured facial expressions, a set of body motions, a set of hand motions, a set of 2D emoji stickers, a set of 3D emojis, a set of accessories, and a set of backgrounds and effects. The emoji database 250 may include data for expressing the face, body, and texture (e.g., an image for expressing a color or texture of a three-dimensional model) of the avatar (e.g., an emoji character). The emoji database 250 may store a set of emojis or a set of animations downloaded from an external electronic device. Data related to the emoji may be provided to the emoji interface module 211 or a third-party application (not shown).

An electronic device 101 according to various embodiments may include a camera (e.g., the camera module 180 in FIG. 1), a display (e.g., the display device 160 in FIG. 1), a processor (e.g., the processor 120 in FIG. 1 or the processor 210 in FIG. 2) operably connected to the camera and the display, and a memory (e.g., the memory 130 in FIG. 1 or the emoji database 250 in FIG. 2) operably connected to the processor, wherein the memory may store instructions that cause, when executed, the processor to display, when an emoji function is executed, menu items supporting entry into an edit mode for each body part by including the same in at least a part of an emoji function user interface displayed on the display, activate, based on a user input requesting entry into a facial expression edit mode in the emoji function user interface, the camera to capture a user face image, generate a facial expression motion file from the user face image, activate, based on a user input requesting entry into a body motion edit mode in the emoji function user interface, the camera to capture a user body image, generate a body motion file from the user body image, adjust sync for combining the generated facial expression motion file and body motion file, and generate a customized emoji sticker reflecting a user facial expression and a body motion by combining the sync-adjusted facial expression motion file and body motion file.

According to an embodiment, the processor may update an avatar related to the emoji function with a facial expression corresponding to the face motion file when generating the facial expression motion file and update the avatar with a body motion corresponding to the body motion file when generating the body motion file.

According to an embodiment, the processor may perform control to apply the avatar updated with the face motion or body motion even when entering an edit mode for each body part.

According to an embodiment, the processor may extract feature points of the user face from the user face image when entering the facial expression edit mode, convert motion data of the user face to a morph target weight value representing the facial expression motion, based on the face feature points, and store the facial expression motion file in the memory, based on the morph target weight value.

According to an embodiment, the processor may perform control to display a customized facial expression emoji generated based on the facial expression motion file by including the same in a facial expression set emoji list provided when entering the facial expression edit mode.

According to an embodiment, the processor may identify joint parts of a user body by extracting feature points of the user body from the user body image when entering the body motion edit mode, convert body motion data to a translation rotation scale (TRS) value representing the body motion, based on the body joint parts, and store the body motion file in the memory, based on the TRS value.

According to an embodiment, the processor may perform control to display a customized body emoji generated based on the body motion file by including the same in a body motion set emoji list provided when entering the body motion edit mode.

According to an embodiment, the processor may perform control to display the generated customized emoji sticker by adding the same to an emoji sticker set list provided in an emoji home screen or emoji showroom mode.

According to an embodiment, the processor may perform control to adjust the number of frames of each file such that the number of frames of the facial expression motion file and the number of frames of the body motion file is the same.

According to an embodiment, the processor may perform control to calculate the number of first necessary frames for animation reproduction based on the facial expression motion file, calculate the number of second necessary frames for animation reproduction based on the body motion file, calculate a reference frame expressing a characteristic motion from the facial expression motion file and the body motion file, and adjust the number of frames by inserting a supplementary frame according to the number of necessary frames of each motion, based on the reference frame.

According to an embodiment, the electronic device may further include a communication module, and the processor may perform control to transmit a body motion recognized from the user body image to an emoji server through the communication module and, if message or text information corresponding to the body motion is received from the emoji server, insert the received message or text information, as a background, into the customized emoji sticker.

According to an embodiment, the processor may perform control to analyze whether or not a sign language pattern is recognized to correspond to the body motion recognized from the user body image and, if the sign language pattern is recognized in relation to the body motion, download a sign language emoji list through the communication module to display the sign language emoji list and generate a sign language emoji sticker, based on an input of sequentially selecting at least one sign language image from the sign language emoji list.

An electronic device 101 according to another embodiment may include a camera (e.g., the camera module 180 in FIG. 1), a display (e.g., the display device 160 in FIG. 1), and a processor (e.g., the processor 120 in FIG. 1 or the processor 210 in FIG. 2) operably connected to the camera and the display, wherein the processor may be configured to display, when an emoji function is executed, an emoji function user interface supporting entry into an edit mode for each body part on the display, receive a user input requesting entry into a facial expression edit mode in the emoji function user interface, activate the camera in the facial expression edit mode to capture a user face image, generate a facial expression motion file from the user face image, perform control to display a customized facial expression emoji corresponding to the generated facial expression file on the emoji function user interface, receiving a user input requesting entry into a body motion edit mode in the emoji function user interface, activate the camera in the body motion edit mode to capture a user body image, generate a body motion file from the user body image, perform control to display a customized body motion emoji corresponding to the generated body motion file on the emoji function user interface, and perform control to generate a customized emoji sticker reflecting a user facial expression and a body motion, based on a user input requesting a combination of the facial expression emoji and the body motion emoji and update the emoji function with the same.

Figure 3:
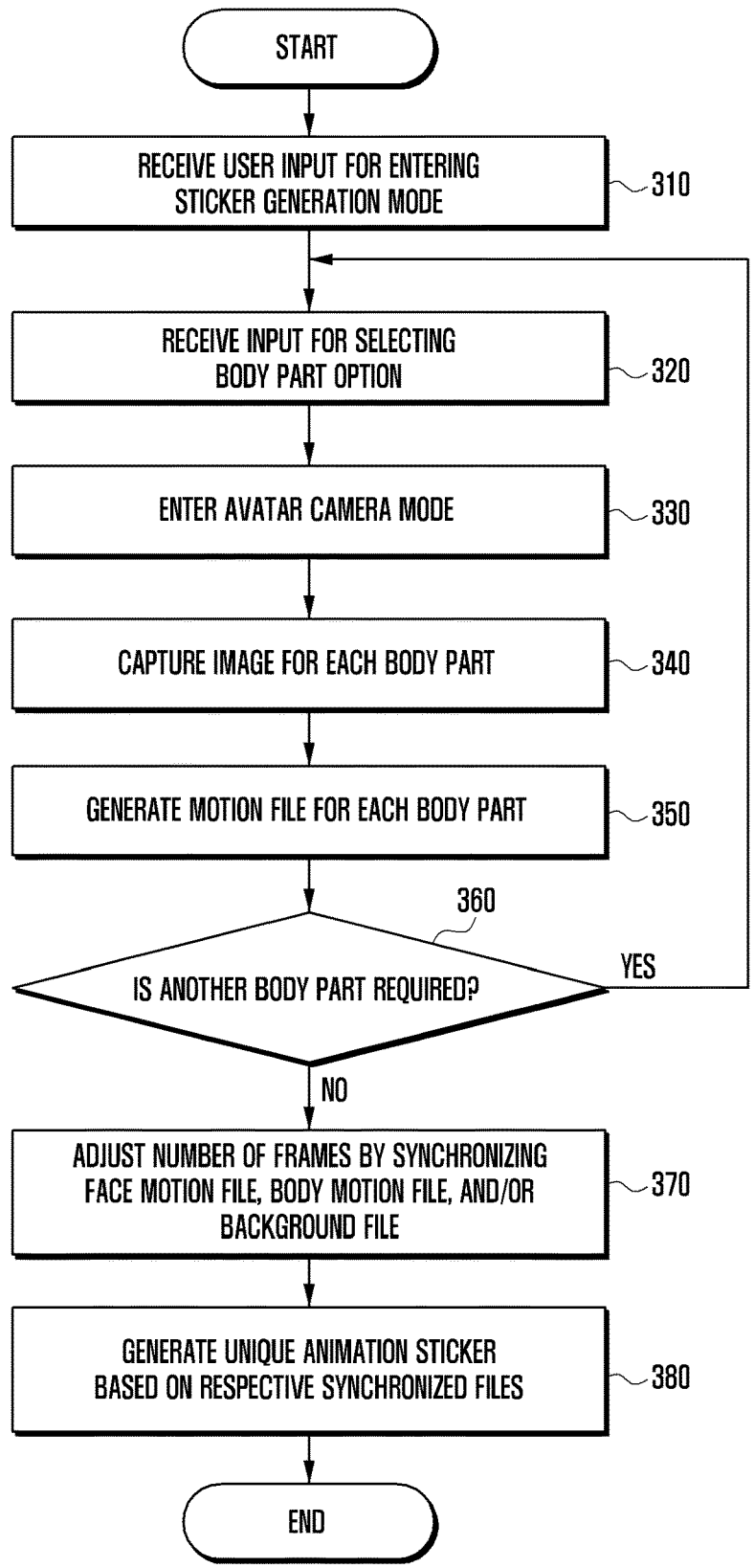
FIG. 3 is a flowchart illustrating a method of generating a user avatar-based emoji sticker in an electronic device according to various embodiments.

FIG. 3 is a flowchart illustrating a method of generating a user avatar-based emoji sticker in an electronic device according to various embodiments.

Referring to FIG. 3, a processor 101 (e.g., the processor 120 in FIG. 1 or the processor 210 in FIG. 2) of the electronic device 101, according to an embodiment, may receive a user input for entering an emoji sticker generation mode in operation 310.

For example, the processor 120 or 210 may receive a user input for selecting an emoji sticker generation option from a camera app menu. As another example, the processor 120 or 210 may receive a user input for selecting an avatar animation app icon or an augmented reality icon. The avatar animation app icon or the augmented reality icon may be included in a home screen. The avatar animation app or the augmented reality app may be understood as an application that supports the generation of avatar characters customized by reflecting user features and emoji/animation stickers and functions related to avatars.

The processor 120 or 210 may display an emoji home screen (or an emoji home mode screen) on a display, based on a user input related to the generation of an emoji sticker. The emoji home screen may include a user interface for supporting functions related to avatars (e.g., an avatar item, a list of preconfigured or provided emoji stickers, and an item for generating a new emoji sticker).

In operation 320, the processor 120 or 210 may receive a user input for selecting a body part option (e.g., a body edit mode item). For example, after entering the emoji sticker generation mode on the emoji home screen, the processor 120 or 210 may select an option item for each body part. As another example, the processor 120 or 210 may receive a user input for selecting one of the body part edit mode items in relation to the generation of an emoji sticker.

In operation 330, the processor 120 or 210 may enter an emoji camera mode to generate a motion file corresponding to the selected body part. In the emoji camera mode, the processor 120 or 210 may obtain an image using a camera module and preview the obtained image (or a low-resolution image corresponding thereto) on the display. The processor 120 or 210 may display a function item (e.g., a shooting item) for capturing a still image or a video together with the preview image.

According to an embodiment, the processor 120 or 210 may perform control to activate a front camera or a rear camera depending on the body part option. For example, the processor 120 or 210 may obtain a selfie image of the user by activating the front camera when entering a facial expression edit mode. Alternatively, the processor 120 or 210 may obtain an image of the user's body part by activating the rear camera when entering a body motion edit mode.

In operation 340, the processor 120 or 210 may obtain a user image based on a user input requesting image capturing (or shooting).

For example, the processor 120 or 210 may capture a user image for a configured time and store the same. Alternatively, the processor 120 or 210 may capture an image by an input for selecting a shooting item, terminate image capturing by a user input for selecting the shooting item once again, and store the same.

In operation 350, the processor 120 or 210 may generate a customized motion file for each body part based on the obtained user image. The processor 120 or 210 may store the generated motion files corresponding to body parts, respectively, and apply them to the user avatar.

According to an embodiment, the processor 120 or 210 may track the motion of the user face (e.g., a change in the facial expression) to identify user face features and a change in the facial expression (e.g., pupils and mouth). The processor 120 or 210 may generate a user (face) avatar reflecting the user face features (or facial features). Alternatively, the processor 120 or 210 may generate and store a face motion file expressing the motion of the facial expression based on tracking a change in the facial expression and may apply the same to the user avatar.

According to an embodiment, the processor 120 or 210 may track motion of the user body (e.g., body behavior change) to identify user body features and a change in the body motion. The processor 120 or 210 may generate a user (body) avatar based on the user body features. Alternatively, the processor 120 or 210 may generate and store a body motion file representing the user body motion based on tracking a change in the body motion and may apply the same to the user avatar.

According to an embodiment, the processor 120 or 210 may track motion of the user hand (e.g., change of fingers of the hand) to identify user hand features and a change in the hand motion. The processor 120 or 210 may generate a user (hand) avatar based on the user hand features. Alternatively, the processor 120 or 210 may generate and store a hand motion file representing the user hand motion based on tracking a change in the hand motion and may apply the same to the user avatar.

In operation 360, the processor 120 or 210 may identify whether or not another body part option is required and, if another body part option is required, return to operation 320.

For example, the user may select a facial expression generation icon to generate and store a facial expression motion file based on the user facial expression and then request to enter a body motion edit mode. Thereafter, the user may proceed with the operation of generating and storing a body motion file in the body motion edit mode. Additionally, the user may enter a background edit mode to insert a background image, a 3D effect, or text/emoticon thereto.

In operation 370, the processor 120 or 210 may adjust the number of frames by synchronizing motion files for each body part, for example, the facial expression motion file, the body motion file, and/or the background file.

In operation 380, the processor 120 or 210 may combine (or synthesize) the respective synchronized files to generate a unique (or customized) emoji sticker (or animation sticker), based on the files separated into face and body parts.

For example, the processor 120 or 210, based on an input for selecting and storing any one of the face motion files and an input for selecting and storing any one of the body motion files, may adjust the number of frames of each motion file and combine the files, thereby generating an emoji sticker.

Figure 4:
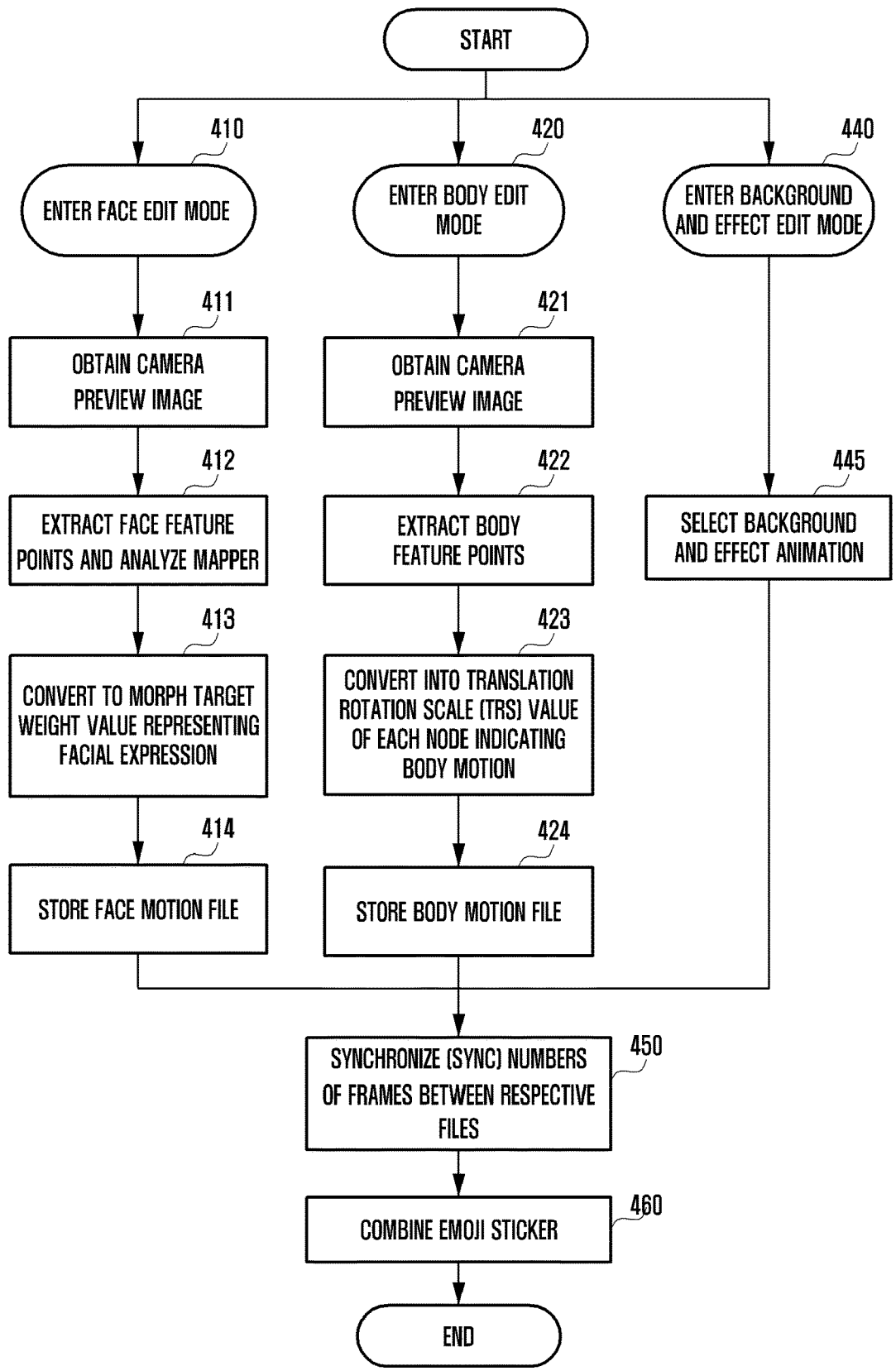
FIG. 4 is a flowchart illustrating a method of generating a user avatar-based emoji sticker in an electronic device according to various embodiments.

FIG. 4 is a flowchart illustrating a method of generating a user avatar-based emoji sticker in an electronic device according to various embodiments.

Referring to FIG. 4, a processor (e.g., the processor 120 in FIG. 1 or the processor 210 in FIG. 2) of an electronic device 101 according to an embodiment may enter an edit mode for each body part individually, optionally, in parallel, or sequentially and perform respective operations.

Optionally, in operation 410, the processor 120 or 210 may enter a facial expression edit mode. For example, the processor 120 or 210 may enter the facial expression edit mode, based on a user input for selecting a facial expression generation item (or a face edit mode item).

In operation 411, the processor 120 or 210 may activate a camera (e.g., a front camera) based on a user input, and obtain a preview image including the face of a subject. The processor 120 or 210 may recognize the face from the preview image. In operation 412, the processor 120 or 210 may extract face feature points and analyze mapping elements corresponding to user face elements. The face feature points may include at least one of eyes, nose, ears, mouth, face shape, and head shape. The mapping element may include at least one of shape, form information, position information, color information, motion information, and length information of each feature point. The mapping element may be an element for expressing a two-dimensional element as a three-dimensional texture and an element for expressing the same as a two-dimensional/three-dimensional motion.

In operation 413, the processor 120 or 210 may convert a basic model of a face shape (e.g., a face open target model) to a target weight value representing a facial expression. For example, the processor 120 or 210 may transform a basic model of a face shape (e.g., a face open target model) into a three-dimensional face shape using face components and combine the mapping elements with the three-dimensional face shape, thereby generating a three-dimensional user face avatar.

In operation 414, the processor 120 or 210 may store a face motion file or a face animation file (e.g., a json file) representing the facial expression motion change. The face motion file or the face animation file may include at least one of motion values of face feature points, the number of frames for motion expression, a shape value of a face model, and a weight change value for changing to a target shape.

The processor 120 or 210 may apply the stored face motion file to the three-dimensional user avatar, thereby updating the avatar so as to reflect the recognized facial expression motion of the user.

Optionally, in operation 420, the processor 120 or 210 may enter a body motion edit mode. For example, the processor 120 or 210 may enter the body motion edit mode based on a user input for selecting a body motion generation item (or a body edit mode item).

In operation 421, the processor 120 or 210 may activate a camera (e.g., a rear camera), based on a user input and obtain a preview image including a body part of a subject. The processor 120 or 210 may recognize the body from the user body part image.

In operation 422, the processor 120 or 210 may extract body feature points. The processor 120 or 210 may identify the skeleton based on human joints (or joint parts) in the body and extract body feature points.

For example, the processor 120 or 210 may track motion of the body (or gesture) of the subject and, based on the tracking, identify motion change of the body (e.g., pupils or mouth). The processor 120 or 210 may analyze a change value of each (body) node for the body motion based on the body joint parts.

In operation 423, the processor 120 or 210 may convert the change value of each node into a translation rotation scale (TRS) value of each node, indicating the body motion. The rotation value may be a value for expressing a two-dimensional body motion as a three-dimensional body texture. The processor 120 or 210 may transform a basic body-shaped model (e.g., a body open target model) into a three-dimensional body shape based on body components and combine the three-dimensional body shape with the rotation value of each body node, thereby generating a three-dimensional user body avatar.

In operation 424, the processor 120 or 210 may store a body motion file or a body animation file (e.g., a bvh file) representing the body motion change. The body motion file or the body animation file may include at least one of the number of frames required for body motion generation, joint information, joint position information, and a rotation value (rotation information) for each joint. According to an embodiment, the processor 120 or 210 may recognize a change in hand motion during the body motion and apply this to the body motion file.

The processor 120 or 210 may apply the stored body motion file to the three-dimensional user avatar to update the avatar so as to reflect the recognized user body motion.

Additionally, selectively or optionally, the processor 120 or 210 may enter a background and/or effect edit mode in operation 440. For example, the processor 120 or 210 may enter a mode capable of editing the emoji background/effects based on a user input requesting editing of a background and effects (e.g., a touch (e.g., tap) onto a background/effect edit menu item or a long press after selecting a specific avatar). The processor 120 or 210 may display a list of background and effect animations when entering the background and effect edit mode.

In operation 445, the processor 120 or 210 may receive a user input for selecting a background and/or effect animation.

In operation 450, the processor may adjust the number of frames such that the face motion file, the body motion file, or the background/effect animation, which is independently stored, is synchronized. For example, the processor 120 or 210 may calculate the number of frames of each generated file and adjust the number of frames such that the face motion and the body motion are to be synchronized. A method for synchronizing the respective files will be described with reference to FIG. 5.

In operation 460, the processor 120 or 210 may transmit the respective files to the sticker combining module to combine a customized emoji sticker (or animation sticker) reflecting the user face and motion features.

For example, the processor 120 or 210 may display a user interface inquiring whether or not to confirm the generation of an emoji sticker after a face motion selection input, a body motion selection input, and a text or background insertion input in each edit mode, generate an emoji sticker by combining the respective motion files and the background/text image, based on user approval input, and add the generated emoji sticker to the emoji sticker list.

Figure 5:
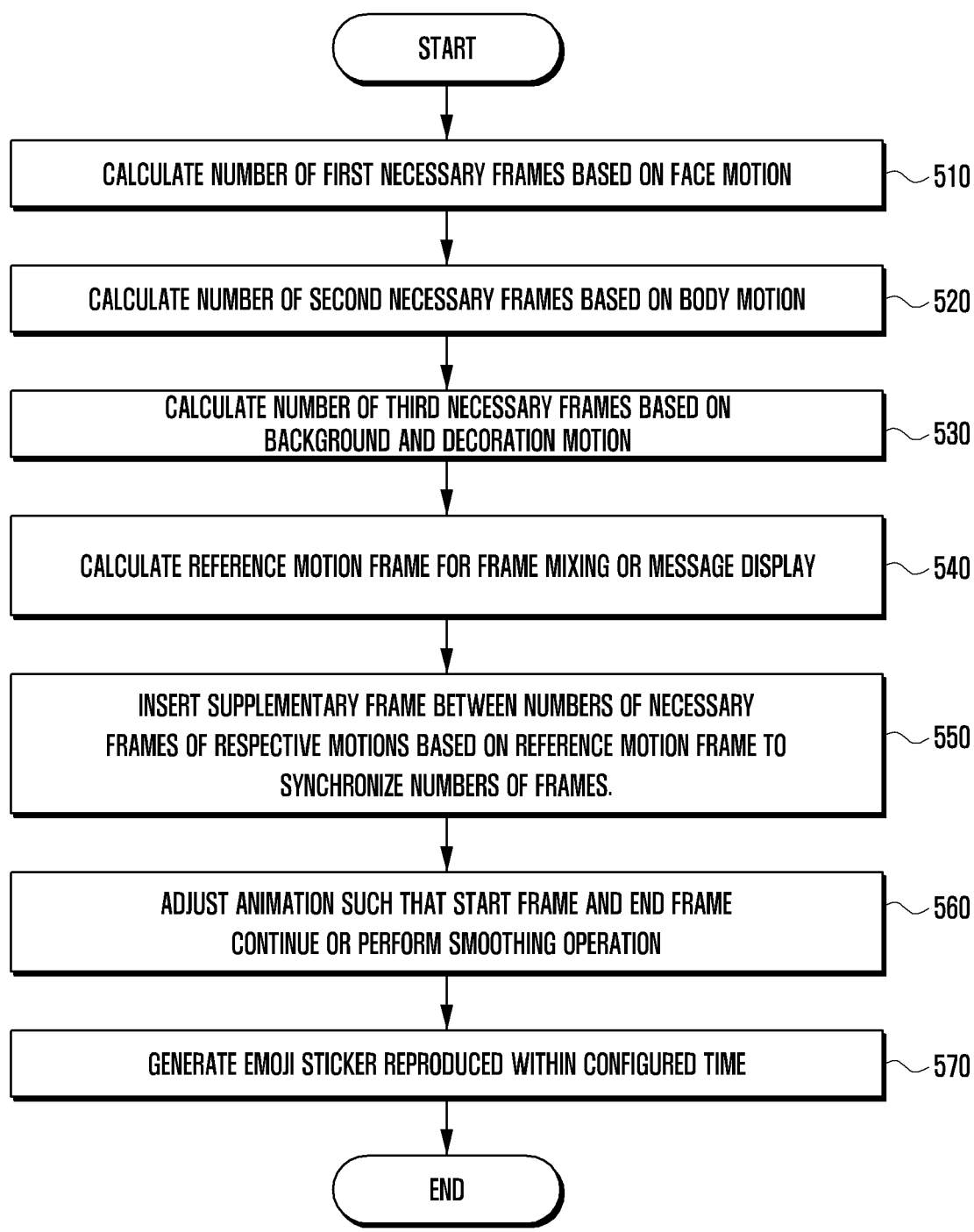
FIG. 5 is a flowchart illustrating a method of synchronizing respective motion files to generate an emoji sticker according to various embodiments.

FIG. 5 is a flowchart illustrating a method of synchronizing respective motion files to generate an emoji sticker according to various embodiments.

Referring to FIG. 5, in a synchronization process for combining respective motion files according to an embodiment, a processor (e.g., the processor 120 in FIG. 1 or the processor 210 in FIG. 2) of an electronic device 101 may calculate the number of first necessary frames, based on a face motion file, in operation 510.

In operation 520, the processor 120 or 210 may calculate the number of second necessary frames based on a body motion file. Optionally or selectively, in operation 530, the number of third necessary frames may be calculated based on a background and decoration motion file.

In operation 540, the processor 120 or 210 may calculate a reference motion frame for frame mixing or message display. In operation 550, the processor 120 or 210 may insert a supplementary frame between the numbers of necessary frames of respective motions, based on the reference motion frame, to adjust the numbers of frames. For example, the processor 120 or 210 may adjust the number of frames of each motion data, thereby repeatedly adjusting a value reproduced for each motion data to be different. The processor 120 or 210 may dispose of the reference motion frames as essential configuration and adjust the number of frames by inserting supplementary frames between the reference motion frames such that the length values of the motion data become the same.

In operation 560, the processor 120 or 210 may adjust the animation such that a start frame and an end frame thereof continue or perform a smoothing operation. As an example, the processor 120 or 210 may remove an unnecessarily bouncing motion value when the animation is reproduced, thereby adjusting the animation to be smoothly reproduced.

In operation 570, the processor 120 or 210 may combine frames between the start frame and the end frame to generate an emoji sticker (or an animation sticker) reproduced within a configured time.

Figure 6:
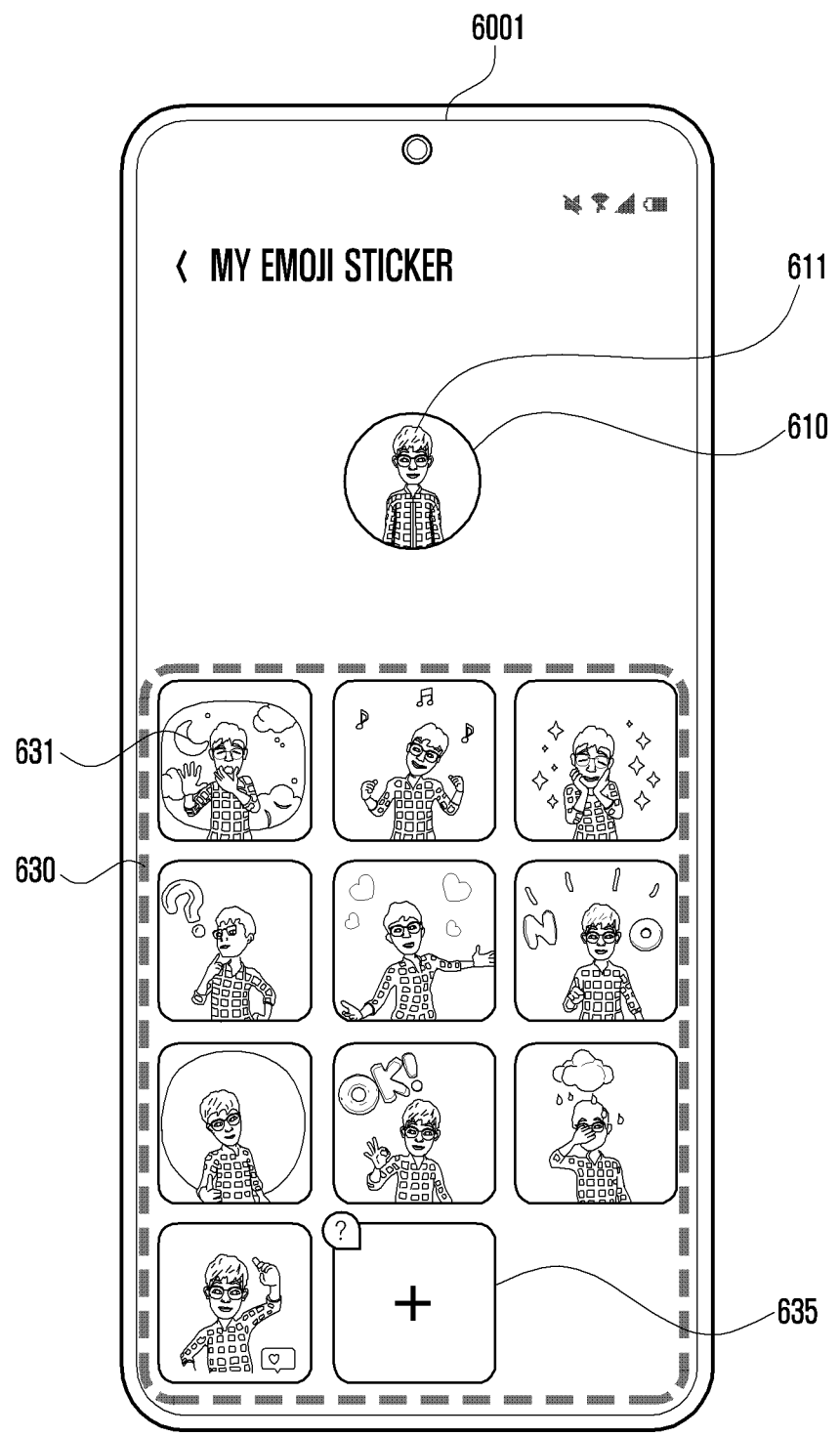
FIG. 6 illustrates a user interface screen of an emoji sticker function according to various embodiments.

FIG. 6 illustrates a user interface screen of an emoji sticker function according to various embodiments.

Referring to FIG. 6, a processor (e.g., the processor 120 in FIG. 1 or the processor 210 in FIG. 2) of an electronic device 101, according to an embodiment, may display an emoji home screen (or an avatar home screen) supporting functions related to the emoji sticker on a display as indicated by 6001. For example, the processor 120 or 210 may display the emoji home screen on the display in response to a request for entering an emoji home mode in the augmented reality app or the camera app (e.g., a touch gesture for selecting an emoji sticker menu). The functions related to the emoji may be provided as an app in app in various applications, as well as the camera app or the augmented reality app, but are not limited thereto.

The processor 120 or 210 may display the emoji home screen 6001, including an avatar display area 610 in which an avatar 611 is displayed and a sticker list 630. The sticker list 630 may include a plurality of sticker packages (or template sticker sets or format sticker sets). The stickers (e.g., 631) provided in the sticker list 630 may be emoji stickers (or animation stickers) pre-made (or stored) by a design tool.

A plus item 635 included in the sticker list 630 may be a menu supporting the generation of a new emoji or customized emoji sticker in the electronic device. For example, the plus item 635 may be provided as a text menu such as "Generate my own emoji sticker".

Additionally, although not shown in the drawings, the emoji home screen 6001 may include items (e.g., a motion sticker generation item and a facial expression sticker generation item) for entering an edit mode for each body part.

Based on a user input (e.g., touching an icon) for selecting the plus item 635, the processor 120 or 210 may enter a mode for generating/editing a new or customized emoji sticker. For example, based on a user input for selecting the plus item 635, the processor 120 or 210 may display the screen 7001 illustrated in FIG. 7A or the screen 8001 illustrated in FIG. 8A. Hereinafter, a user interface screen related to each edit mode will be described.

Figure 7A:
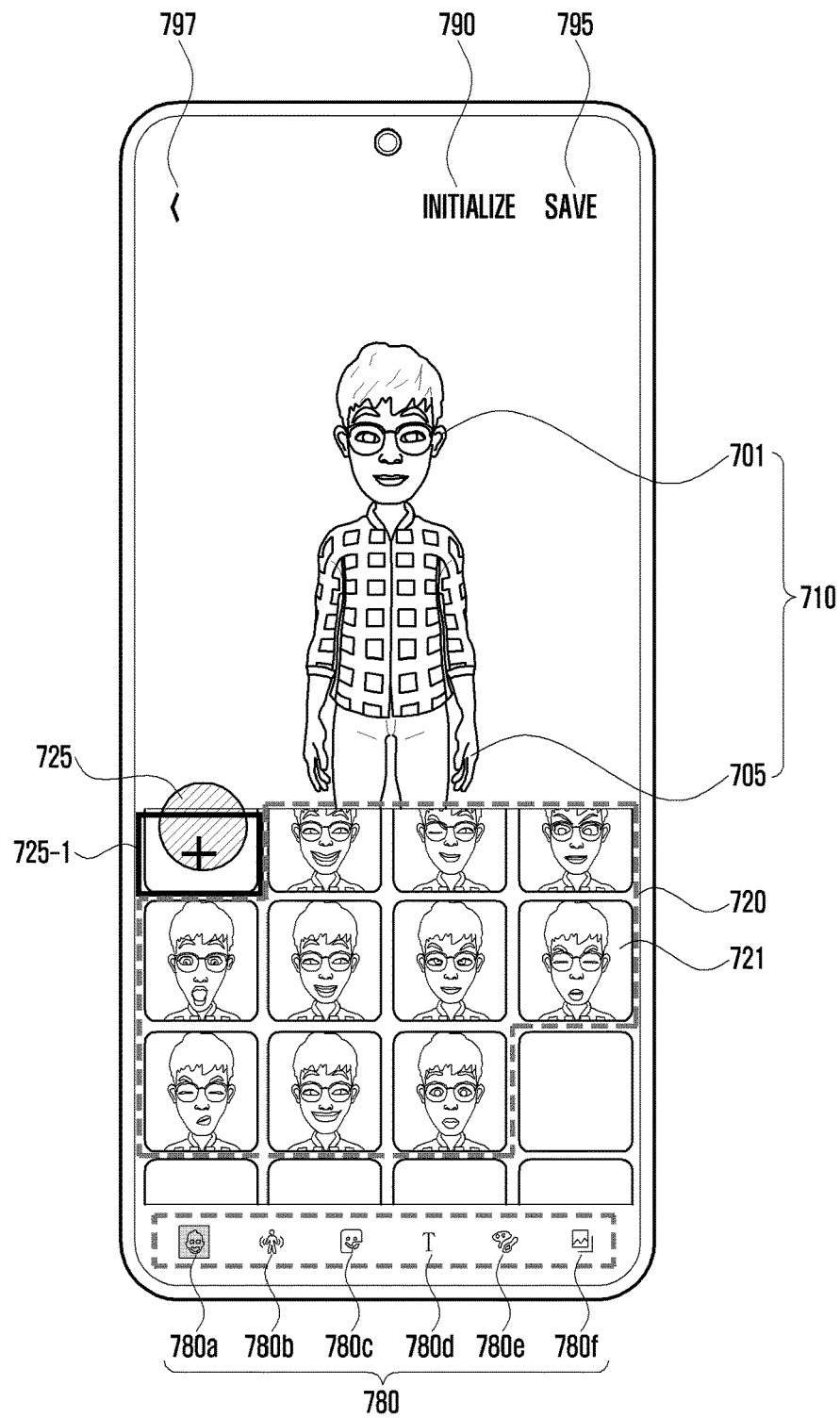
FIGS. 7A to 7C illustrate a user interface screen for generating a face motion emoji according to various embodiments.
Figure 7B:
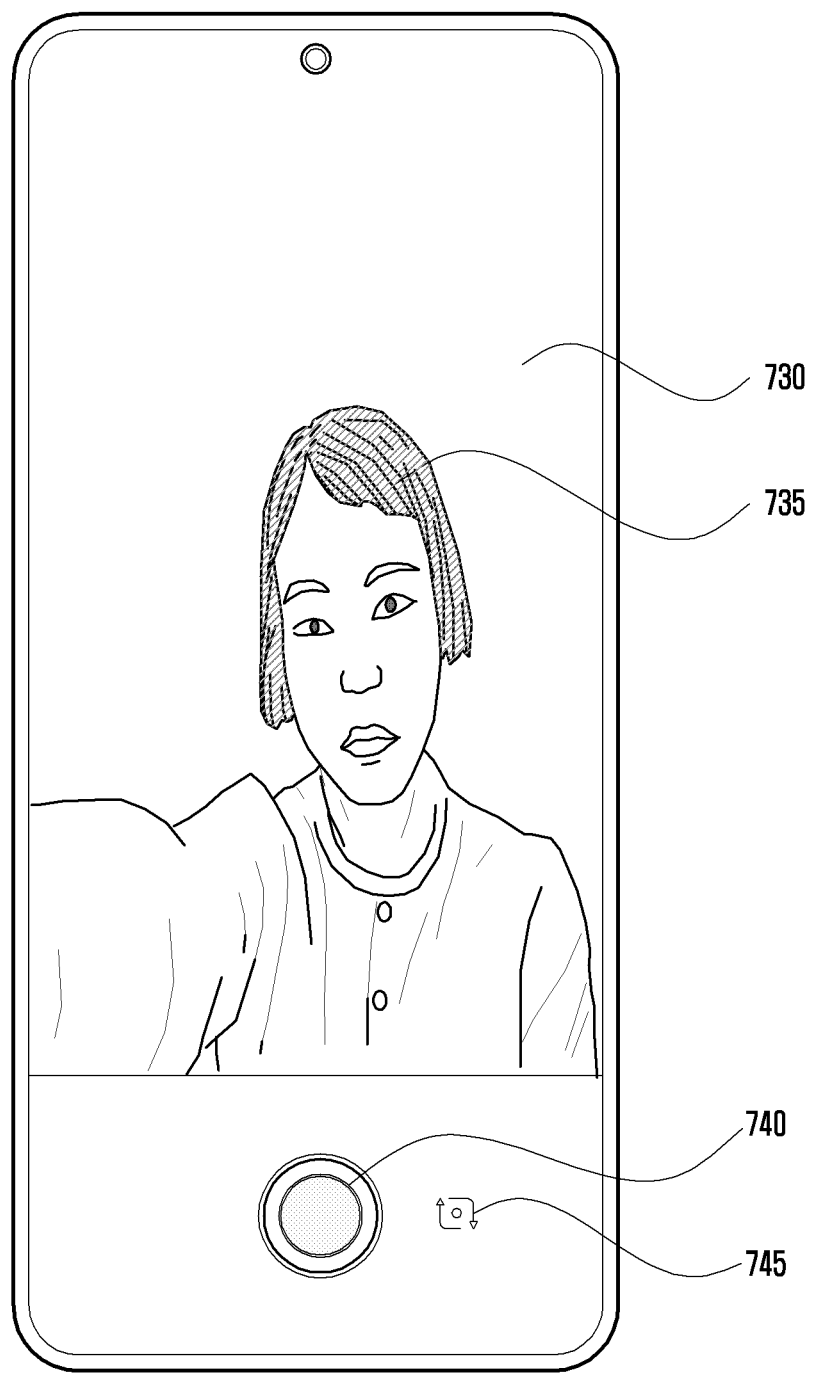
Figure 7C:
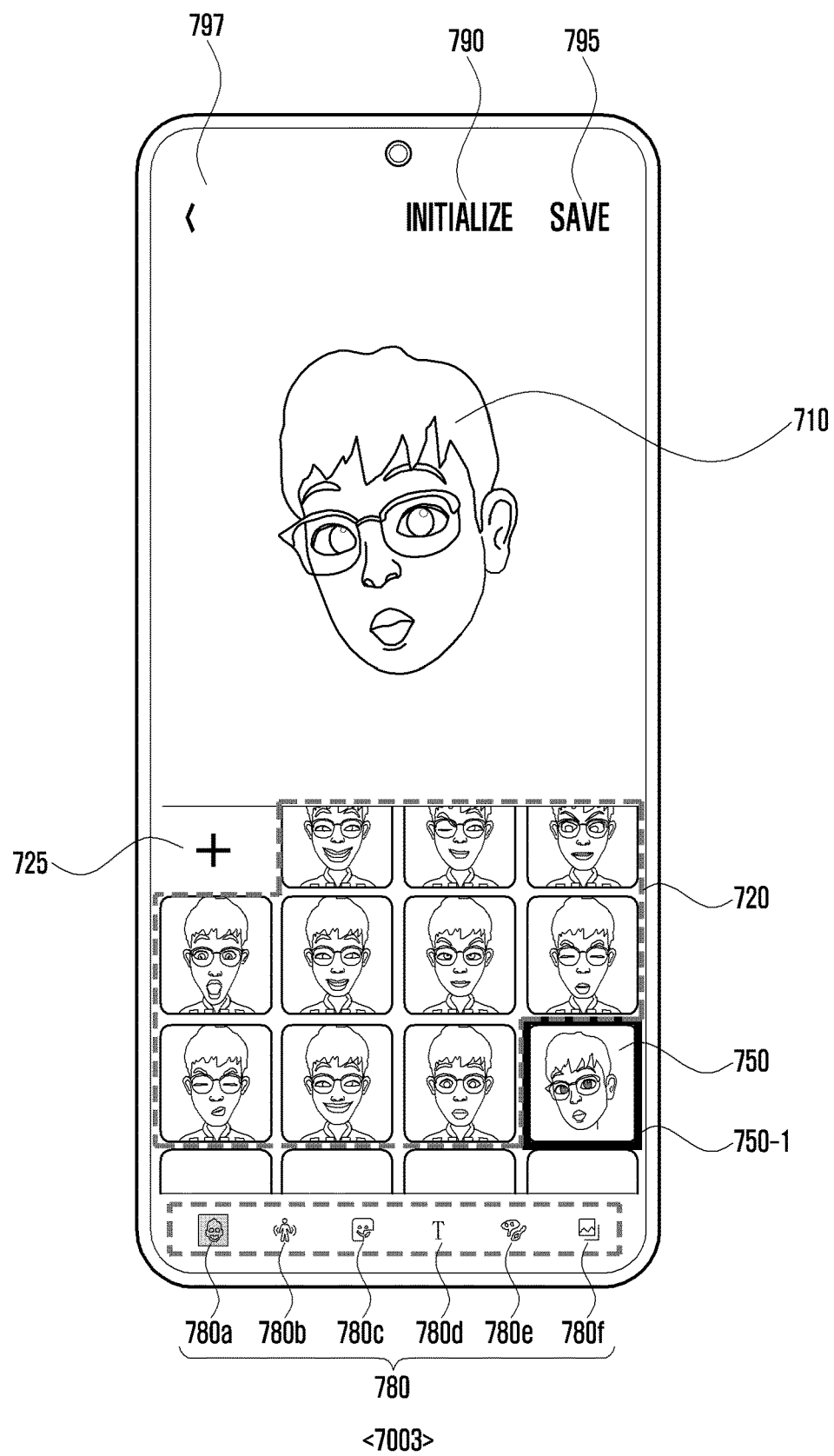

FIGS. 7A to 7C illustrate a user interface screen for generating a face motion emoji according to various embodiments.

Referring to FIGS. 7A to 7C, a processor (e.g., the processor 120 in FIG. 1 or the processor 210 in FIG. 2) may receive a user input for selecting the plus item 635 on the avatar home screen 6001 shown in FIG. 6.

According to an embodiment, the processor 120 or 210, based on a user input, may enter a face motion edit mode and switch to a face motion edit screen 7001, as shown in FIG. 7A. For example, entry into the face motion edit mode may be configured as a default when the plus item 635 is selected from the avatar home screen 6001, but entry into the last edit mode stored by the user in relation to the emoji may also be configured.

According to another embodiment, if the user selects the plus item 635 on the emoji home screen 6001 in FIG. 6, a screen divided into an area for displaying an avatar 710 and an area for an emoji function interface 780 may be displayed, and if the user selects a facial expression edit menu 780a in the emoji function interface 780, it may enter a facial expression edit mode, and a facial expression list 720 may be displayed while reducing the size of the area displaying the avatar 710 as shown in a screen 7001.

The avatar 710 may include a face area 701 or a body area 705. The processor 120 or 210 may express the avatar 710 in the form of a face selected or stored by the user.

The emoji function interface 780 may support entry into each edit mode by user selection. The emoji function interface 780 may include at least one of, for example, a facial expression edit menu 780a, a body motion edit menu 780b, a sign language edit menu 780c, a text edit menu 780d, an effect edit menu 780e, and a background edit menu 780f. For example, if the user selects the body motion edit menu 780b, the processor 120 or 210 may switch to a body motion edit mode and display a facial expression list 720 as a body motion list.

According to an embodiment, if any one individual edit menu is selected by the user, the processor 120 or 210 may process the same such that the selected edit menu is visually distinguished from unselected edit menus. For example, in the case of an input for selecting the facial expression edit menu 780*a* as shown in 7001, the processor 120 or 210 may display a square box surrounding the facial expression edit menu 780*a* or display the facial expression edit menu 780*a* to be highlighted as a memo form.

The facial expression list 720 may include a plurality of facial expression emoji packages (or facial expression template sets or facial expression format sets). The facial expression emojis (e.g., 721) provided in the facial expression emoji list 720 may include emojis pre-made (or stored) by a design tool.

The processor 120 or 210 may receive a user input for generating a customized facial expression motion, for example, an input for selecting a motion plus item 725. The processor 120 or 210 may display a visual effect indicating that the motion plus item 725 has been selected, for example, a square box 725-1 surrounding the plus item, but the disclosure is not limited thereto.

As shown in FIG. 7B, based on the selection of the motion plus item 725, the processor 120 or 210 may activate a camera function to enter an emoji camera mode (switch to a camera mode screen). The processor 120 or 210 may display the image received from the camera as a preview image. An emoji camera mode screen 7002 may include a preview area 730 in which a subject 735 is displayed and a shooting item 740. The emoji camera mode screen 7002 may include a re-shooting item 745 for re-acquiring (or re-capturing) an image of the subject 735.

The processor 120 or 210 may shoot (capture and store) an image of the subject 735 for a predetermined time, based on a user input for selecting the shooting item 740. Alternatively, the processor 120 or 210 may start shooting in response to an input of selecting the shooting item 740 and end shooting in response to an input of selecting the shooting item 740 again.

As another example, although not shown in the drawing, the processor 120 or 210 may display a gallery entry menu (not shown) for calling an image stored in the electronic device 101 by including the same in the emoji camera mode screen 7002. The processor 120 or 210 may call an image stored in the electronic device 101 in response to a user input of selecting the gallery entry menu and display the same, instead of the preview image, on the display.

For example, the processor 120 or 210 may recognize a face area from the preview image or the shot image and analyze the facial features of the subject. The processor 120 or 210 may process the image such that the avatar face is similar to the actual facial expression of the user.

The processor 120 or 210 may track a change in the facial expression, based on face feature points, to generate a face motion file expressing a change in the facial expression of the captured image.

The processor 120 or 210, based on the generation of the face motion file, may include a customized facial expression emoji 750 in the facial expression list 720 and, as shown in FIG. 7C, display a screen indicated by 7003. The processor 120 or 210 may process the customized facial expression emoji 750 reflecting user features to be visually distinguished from the preconfigured (or provided) facial expression emojis (e.g., process the same to have a different shade or color). For example, the processor 120 or 210 may display a visual effect indicating that the customized facial expression emoji 750 applied to the avatar was newly generated/applied, for example, a square box 750-1 surrounding the emoji.

The processor 120 or 210 may display an initialization menu 790, a save menu 795, and a return menu 797 for returning to the avatar home screen (6001 in FIG. 6) by including the same in the facial expression editing screen 7001. The processor 120 or 210, based on a selection of the initialization menu 790, may initialize the emoji files being edited by the user. The processor 120 or 210, based on a selection of the save menu 795, may store the generated facial expression emoji 750. Additionally, although not shown in the drawings, the processor 120 or 210 may display a menu (not shown) for changing the avatar face shape to another face shape in an area adjacent to the initialization menu 790. The function menus are not limited thereto and may vary depending on functions supported by the emoji service.

According to an embodiment, the processor 120 or 210 may update the file applied to the face of the avatar 710 with the generated file of facial expression emoji 750. For example, the processor 120 or 210 may apply the face motion file or face animation file (e.g., a json file) generated in operation 414 to the face area of the avatar 710.

According to an embodiment, in the case of updating only the avatar face area with the facial expression emoji 750, the processor 120 or 210 may apply motion data corresponding to the facial expression emoji 750 to the face area of the avatar 710 and adjust the number of frames thereof to be synchronized with the motion data corresponding to the body area, thereby performing image processing such that the facial expression motion of the avatar and the body motion are seamlessly reproduced.

In the following drawings, detailed descriptions of the same elements as those in FIGS. 7A to 7C will be omitted.

Figure 8A:
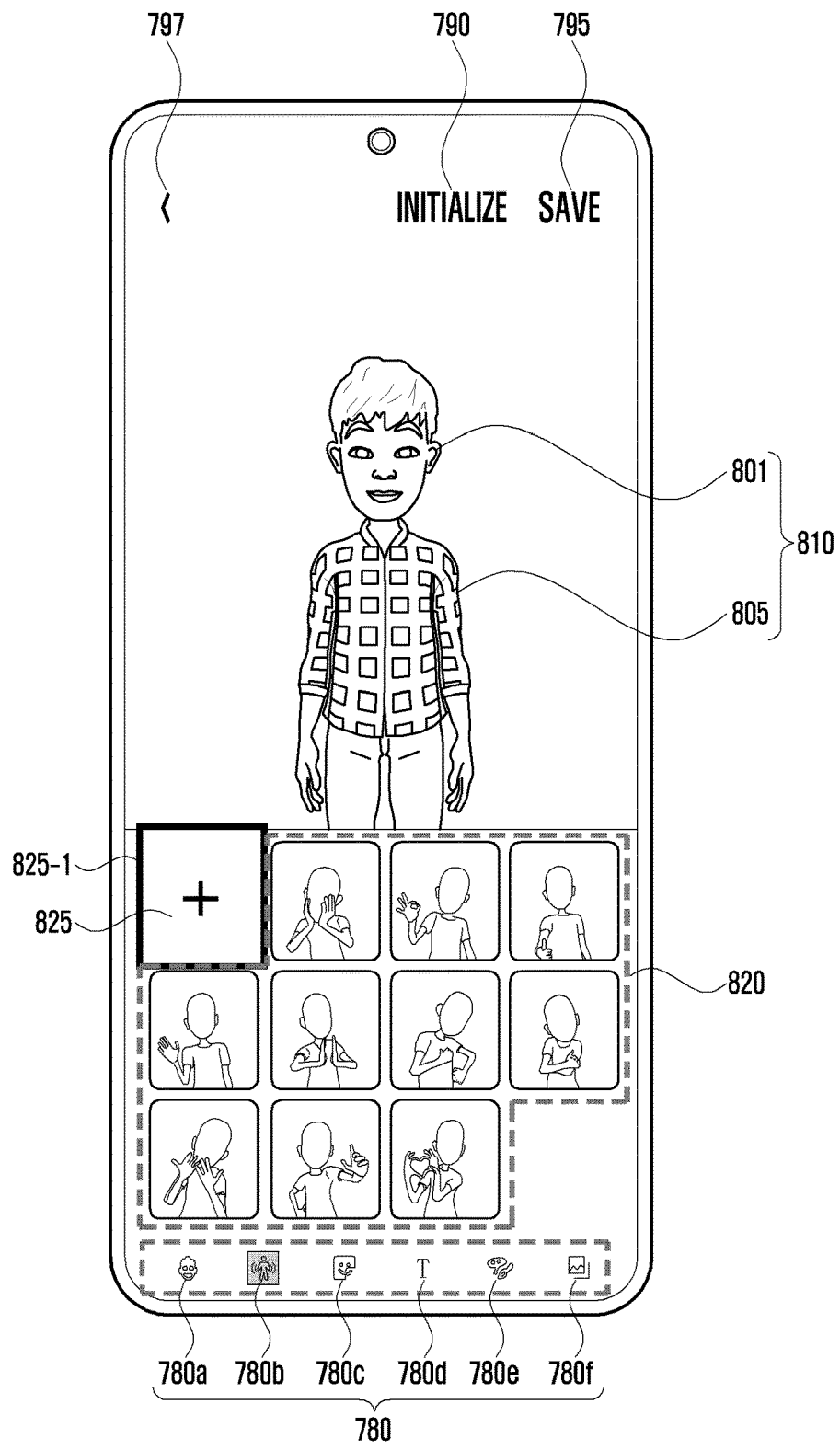
FIGS. 8A to 8C illustrate a user interface screen for generating a body motion emoji according to various embodiments.
Figure 8B:
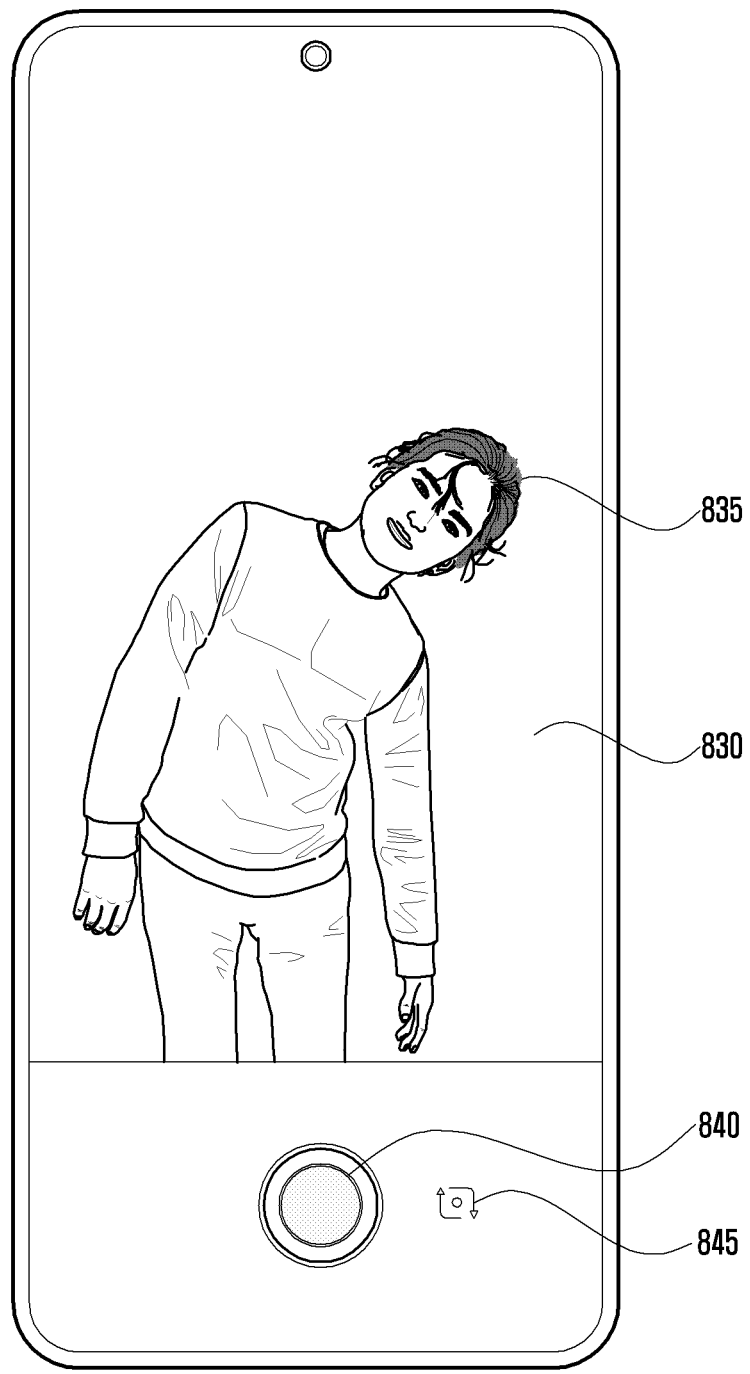
Figure 8C:
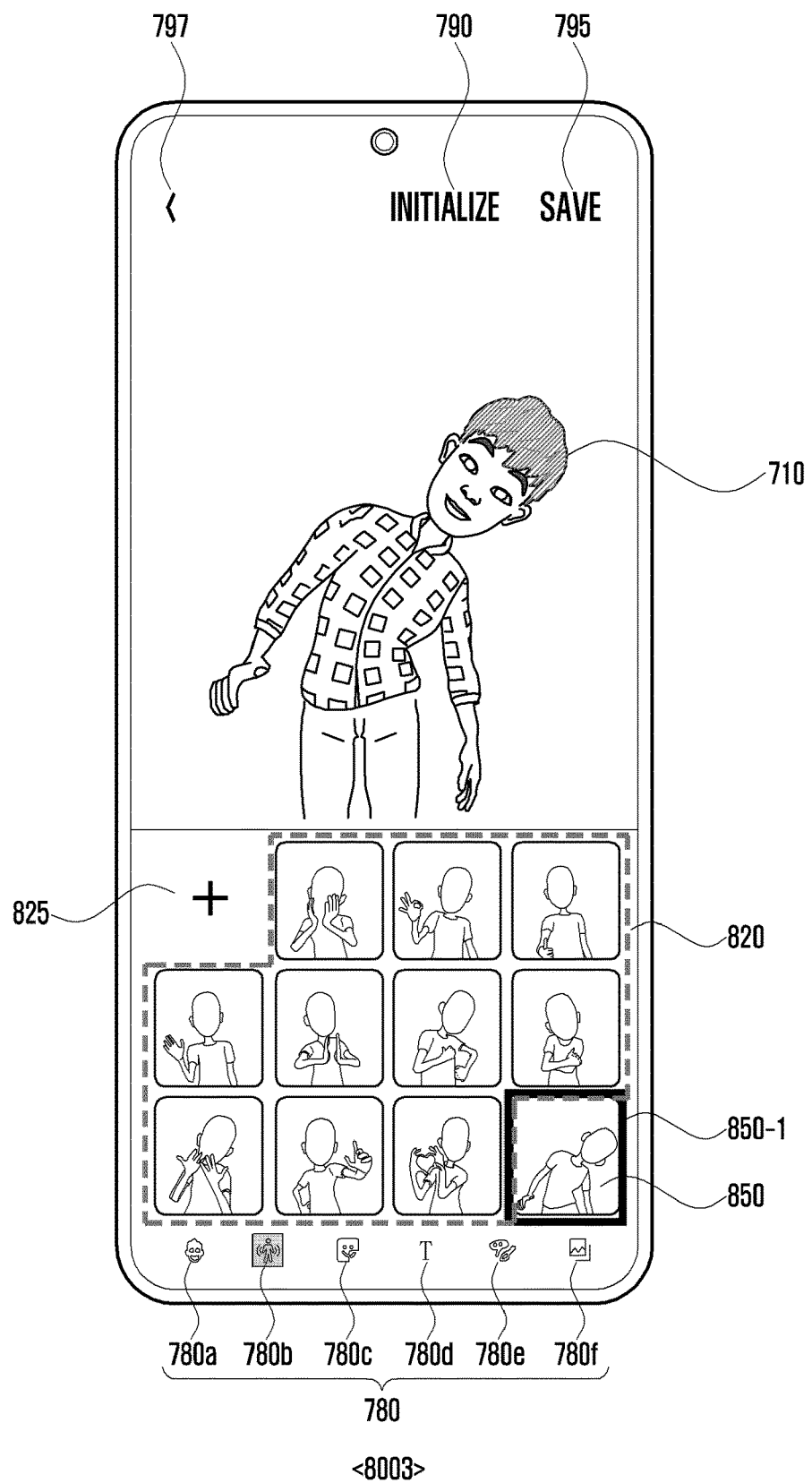

FIGS. 8A to 8C illustrate a user interface screen for generating a body motion emoji according to various embodiments.

FIGS. 8A to 8C, according to an embodiment, the electronic device 101 may support entry into a body motion edit mode based on an image function interface 780.

For example, a processor (e.g., the processor 120 in FIG. 1 or the processor 210 in FIG. 2) may switch to a body motion edit screen 8001, based on a user input of selecting the body motion edit menu 780*b*.

For example, when the body motion edit menu 780*b* is selected, the processor 120 or 210 may convert the facial expression list 720 to a body motion list 820.

The processor 120 or 210 may express an avatar 810 as a body emoji selected by the user or a body emoji stored last. The processor 120 or 210 may also apply the facial expression emoji, which is stored in the facial expression edit mode, in the body motion edit mode.

The body motion list 820 may include a number of body motion emoji packages (or body motion template sets or body motion format sets). Body emojis (e.g., 821) provided in the body emoji list 820 may include emoji stickers pre-made (or stored) by a design tool.

The processor 120 or 210 may receive a user input for generating a characteristic body motion, for example, an input for selecting a motion plus item 825. The processor 120 or 210 may display a visual effect indicating that the motion plus item 825 is selected, for example, a square box 825-1 surrounding the plus item 825.

As shown in FIG. 8B, the processor 120 or 210, based on a selection of the motion plus item 825, may activate a camera function to enter an emoji camera mode (switch to a camera mode screen). The processor 120 or 210 may display the image received from the camera as a preview image, and a camera mode screen 8002 may include a preview area 830 in which a subject 835 is displayed and a shooting item 840. The emoji camera mode screen 8002 may include a re-shooting item 845 for re-acquiring (or re-shooting) an image of the subject 835.

In the emoji camera mode, the processor 120 or 210 may obtain an image including a subject using the camera and display the obtained image (or a copy corresponding thereto (e.g., a low-resolution image)) in the preview area.

The processor 120 or 210 may receive a user input for selecting the shooting item 840 in order to photograph the body action of the subject. The processor 120 or 210 may shoot (capture and store) an image of the subject for a predetermined time. Alternatively, the processor 120 or 210 may start shooting in response to an input of selecting the shooting item 840 and end shooting in response to an input of selecting the shooting item 840 again. Although not shown in the drawings, the processor 120 or 210 may call a stored image (e.g., a still image or a moving image) through a gallery entry menu (not shown) for calling an image stored in the electronic device 101 and display the same on the display.

The processor 120 or 210 may recognize a body area of the subject from the preview image or the shot image and analyze subject's body features. For example, the processor 120 or 210 may perform image processing such that the avatar body is similar to the actual body shape of the user.

The processor 120 or 210 may track a change in body motion, based on body feature points, to generate a body motion file representing a change in the captured body motion.

The processor 120 or 210, based on the generation of the body motion file, as shown in FIG. 8C, may include a customized body motion emoji 850 in the body emoji list 820 and display the screen indicated by 8003. The processor 120 or 210 may process the customized body motion emoji 850 to be visually distinguished from other body motion emojis 820 (e.g., process the same to have a different shade or color). For example, the processor 120 or 210 may display a square box 850-1 surrounding the customized body motion emoji 850.

The processor 120 or 210 may update the file applied to the body of the avatar 710 with the generated file of body motion emoji 850. For example, the processor 120 or 210 may apply the body motion file (e.g., a bvh file), which is generated in operation 444, to the body area of the avatar 710.

According to an embodiment, the user may select the customized facial expression emoji generated in the facial expression edit mode and apply the same to the avatar. Thereafter, the user may select the customized body motion emoji generated in the body motion edit mode and apply the same to the avatar. If the user selects the save item 795, the processor 120 or 210 may generate an emoji sticker by combining the facial expression motion and the body motion and then, add the generated emoji sticker to the emoji sticker list (e.g., 630 in FIG. 6).

Figure 9A:
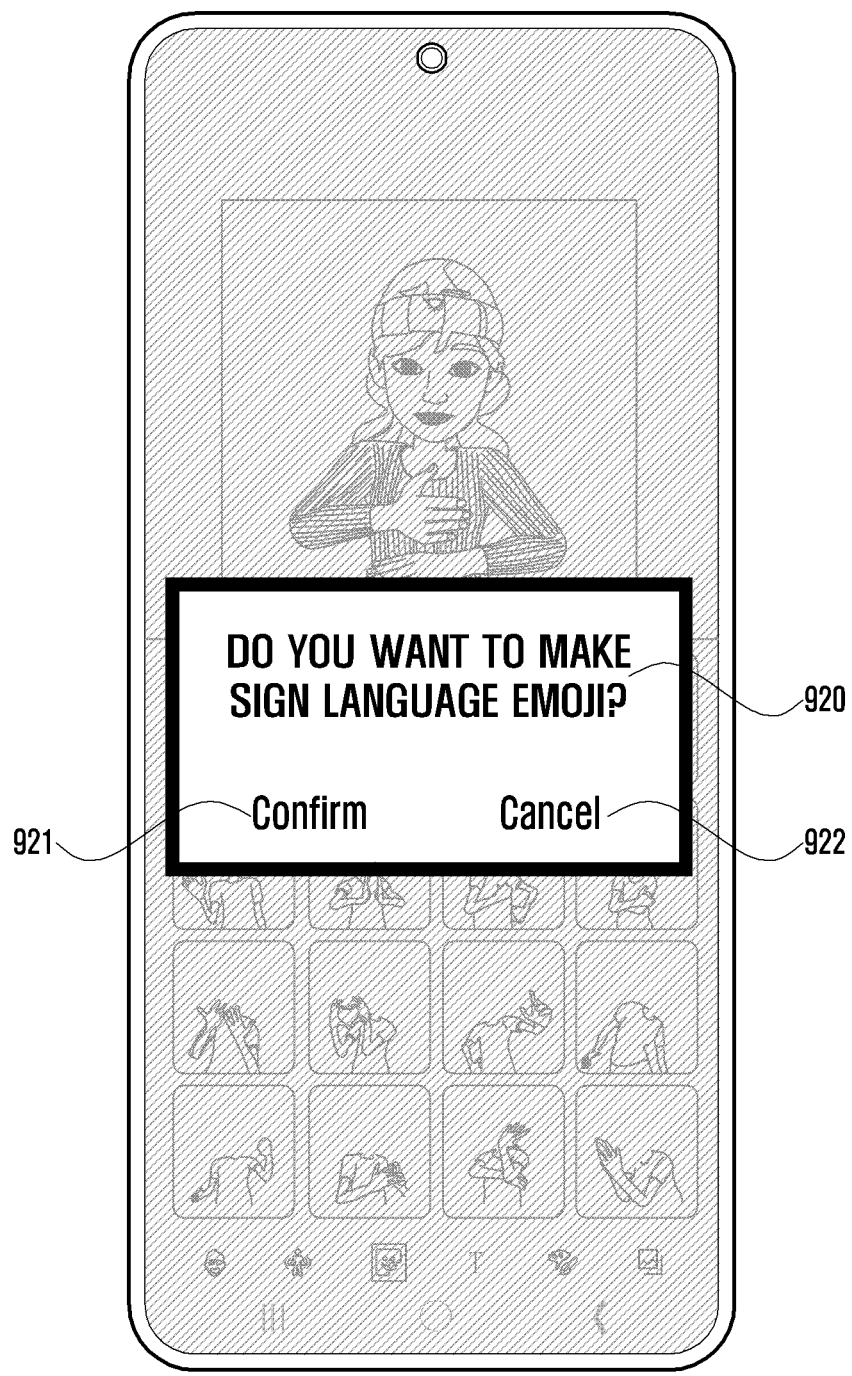
FIGS. 9A to 9C illustrate a user interface screen for generating a sign language emoji according to various embodiments.
Figure 9B:
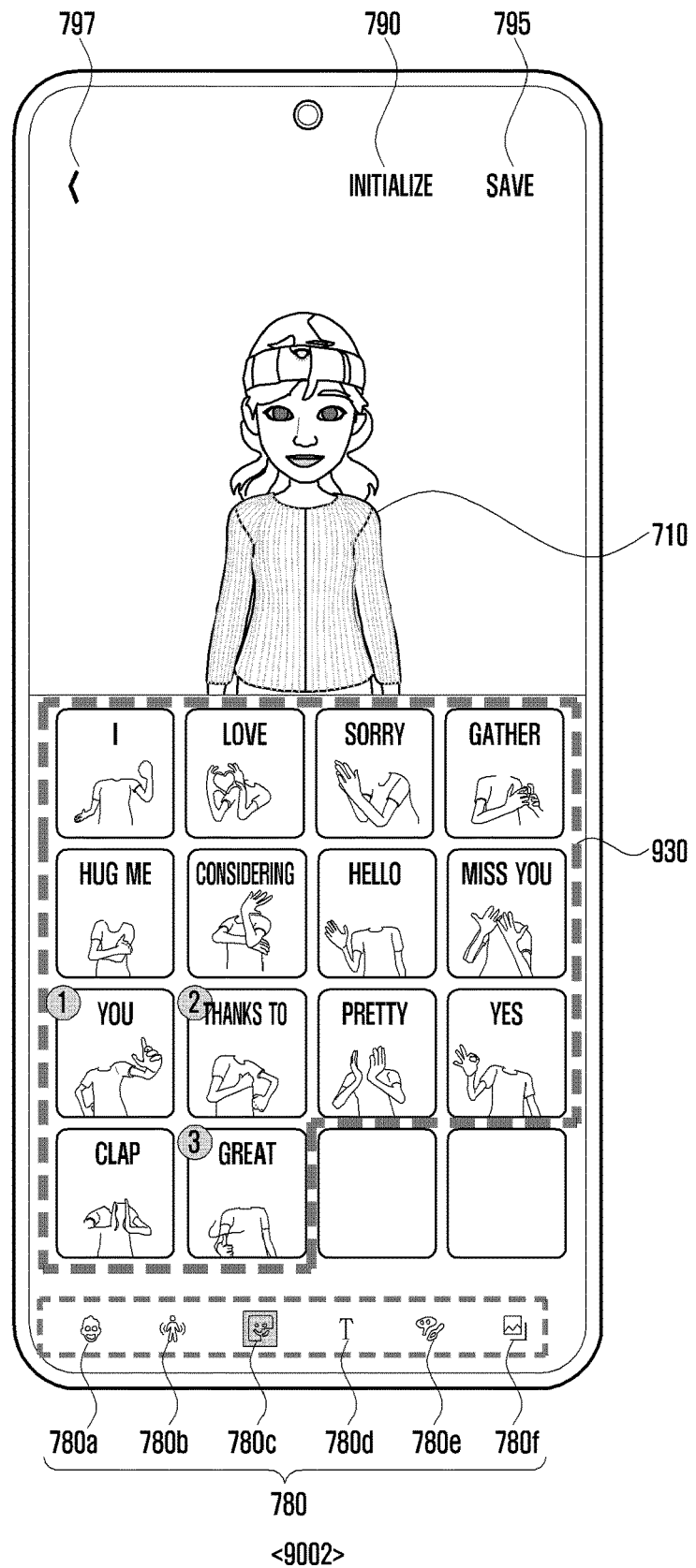
Figure 9C:
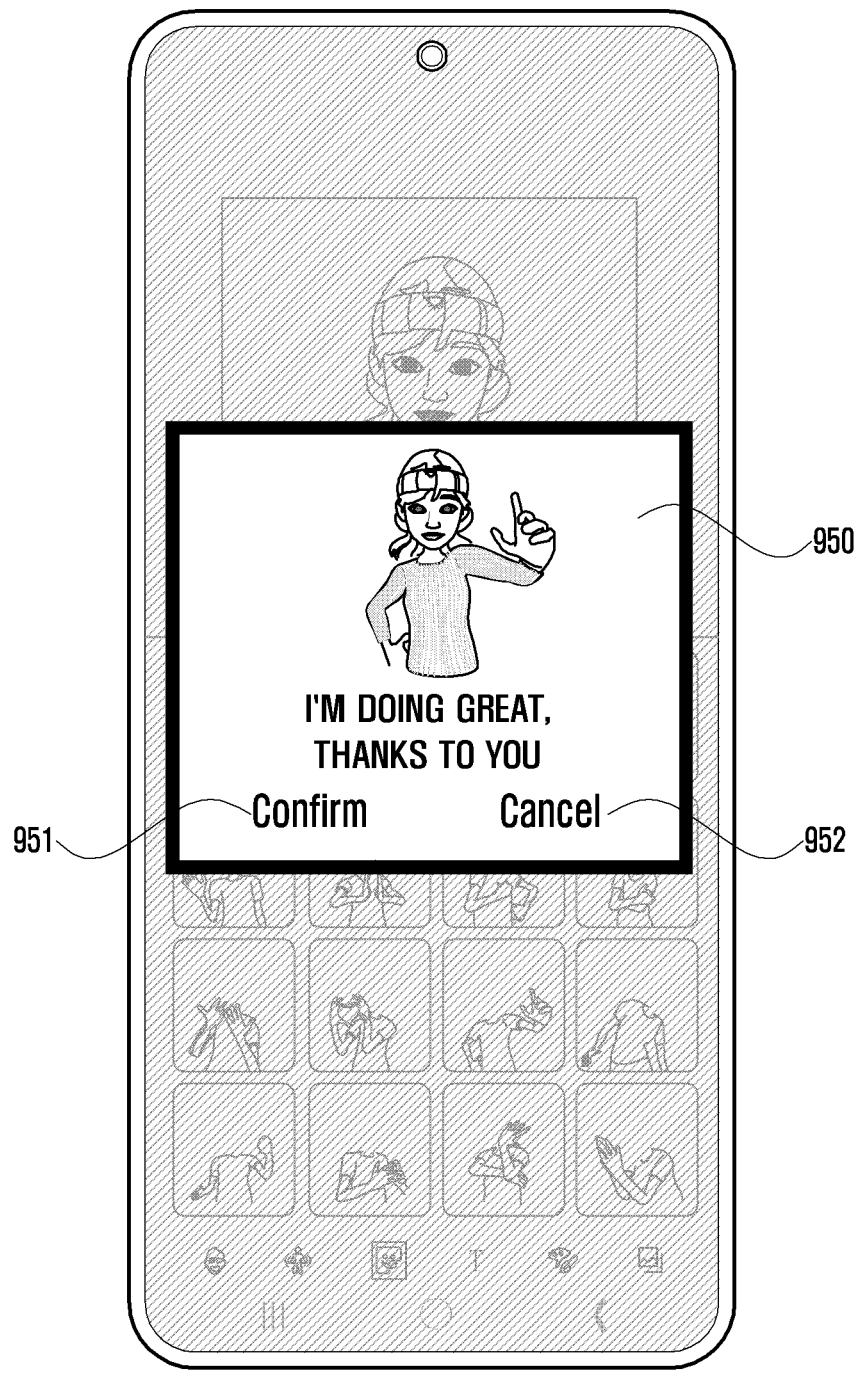

FIGS. 9A to 9C illustrate a user interface screen for generating a sign language emoji according to various embodiments.

Referring to FIGS. 9A to 9C, according to another embodiment, the electronic device 101 may support the generation of a sign language emoji based on a body motion independently of an emoji sticker based on a combination of a face motion file and a body motion file.

For example, a processor (e.g., the processor 120 in FIG. 1 or the processor 210 in FIG. 2) may analyze whether or not a sign language pattern is recognized in response to a change in the body motion being shot in the body motion edit mode. The processor 120 or 210 may transmit body motion information being shot to a sign language database server through a communication module and identify whether or not a sign language pattern corresponding to the body motion is recognized from the server.

If a sign language pattern is recognized in relation to the body motion and if it is possible to generate a sign language emoji, the processor 120 or 210, as shown in 9A, may display a sign language emoji generation interface 920 on a display. The sign language emoji generation interface 920 may include a confirm item 921 and a cancel item 922 for confirming whether or not to generate a sign language image.

If the user selects the confirm item 921, the processor 120 or 210 may download a sign language emoji list 930 related to the sign language from a server, enter a sign language edit mode, and, as shown in 9B, display a sign language edit screen 9002. The sign language emoji list 930 may include actions expressing sign language and messages corresponding to the actions.

As another example, based on an input for selecting a sign language edit menu 730 in the emoji function interface 780, the processor 120 or 210 may display the sign language edit screen 9002.

According to another embodiment, if a confirmation input for generating a sign language emoji is received, the processor 120 or 210 may transmit country code information of the electronic device 101 to the server and receive a sign language emoji list 930 corresponding to a corresponding country from the server. The processor 120 or 210 may display the sign language emoji list 930 in a language corresponding to the corresponding country based on the received sign language data.

The user may sequentially select and input (e.g., sequential input after a long press) a first sign language emoji (e.g., you), a second sign language emoji (e.g., thanks to), and a third sign language emoji (e.g., great) from the sign language emoji list 930 to generate a sign language emoji sticker.

The processor 120 or 210 may output a sign language emoji sticker (e.g., I'm doing great, thanks to you) interface 950, as shown in FIG. 9C, based on the sequential input of selecting emojis. The sign language emoji sticker interface 930 may include a confirm item 951 for confirming approval of the generated sign language emoji and a cancel item 952.

The processor 120, 210 may add a sign language emoji sticker 960 (e.g., I'm doing great, thanks to you) to the emoji sticker list (630 in FIG. 6), based on an input of selecting the sign language emoji confirm item 951.

Figure 10:
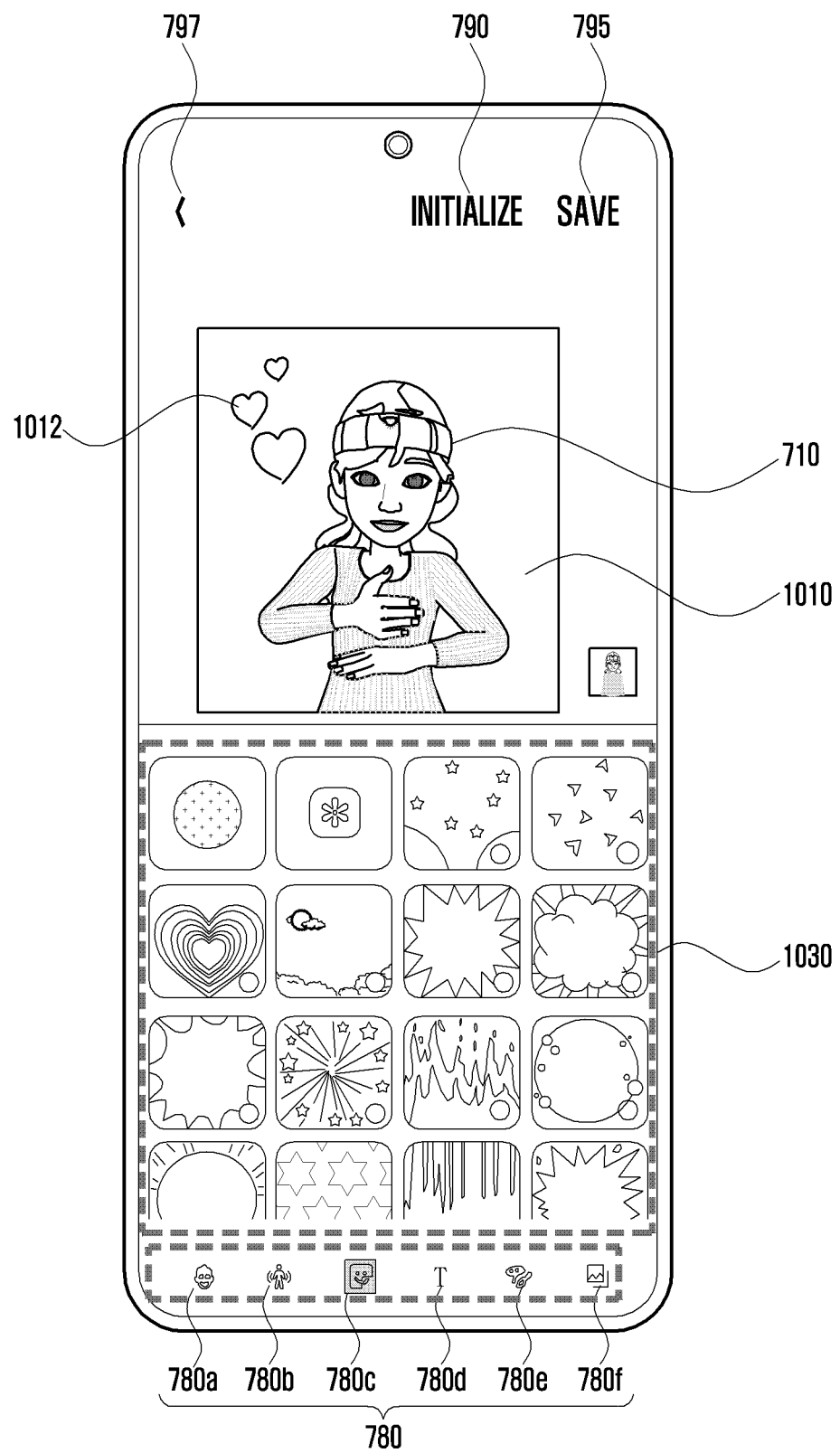
FIG. 10 illustrates a user interface screen for applying a background emoji according to various embodiments.

FIG. 10 illustrates a user interface screen for applying a background emoji according to various embodiments.

Referring to FIG. 10, according to an embodiment, the electronic device 101 may support entry into a background edit mode based on the image function interface 780. A processor (e.g., the processor 120 in FIG. 1 or the processor 210 in FIG. 2) may switch to a background edit screen, based on a user input of selecting a background edit menu 780f in the emoji function interface 780, to display a background package list 1030.

The processor 120 or 210, based on selecting any one background image from the background package list 1030, may apply and display the selected background image 1010 to and on the avatar 710 (or emoji sticker).

Additionally or optionally, the user may enter an effect edit menu 780e in the emoji function interface 780 to apply a 2D or 3D effect 1012 to the avatar 710 (or emoji sticker) (e.g., add accessories or change color). Alternatively, the user may insert text through the text edit menu 780c.

Figure 11:
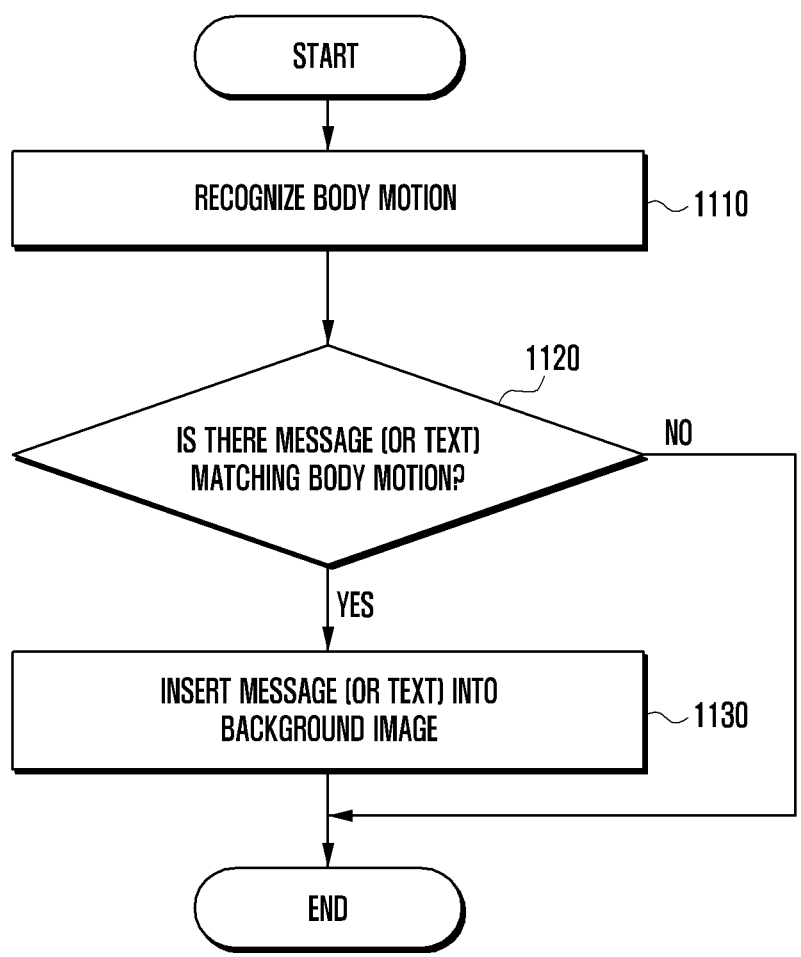
FIG. 11 is a flowchart illustrating a method for generating an emoji sticker according to various embodiments.

FIG. 11 is a flowchart illustrating a method for generating an emoji sticker according to various embodiments.

Referring to FIG. 11, according to an embodiment, additionally or optionally, when executing an emoji camera mode, a processor (e.g., the processor 120 in FIG. 1 or the processor 210 in FIG. 2) may recognize a captured body motion of a subject in operation 1110.

In operation 1120, the processor 120 or 210 may determine whether or not a message or text matching features of the body motion is recognized.

In operation 1130, in the case where a message or text matching the motion features is recognized, the processor 120 or 210 may generate an emoji sticker by inserting the recognized message or text into a background image.

For example, when the processor 120 or 210 recognizes a body motion in which the subject is waving a hand, the processor 120 or 210 may recognize that the motion feature thereof matches a message "hello" and insert the text "hello" into the emoji sticker background. Alternatively, if the subject's body is recognized as a motion feature of bowing, the processor may recognize that the corresponding motion feature also matches the message "hello" and insert the text "hello" into the emoji sticker background.

Figure 12:
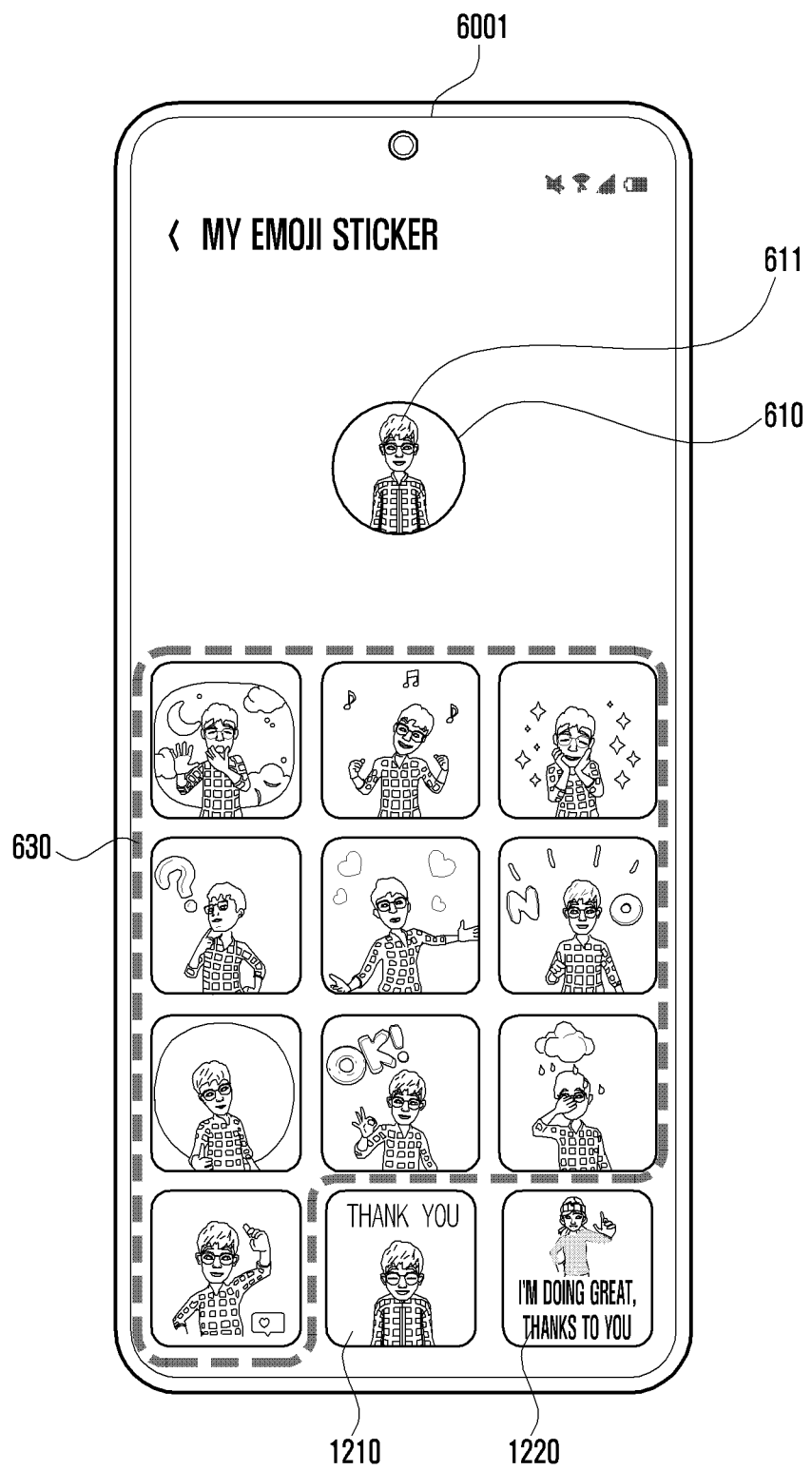
FIG. 12 illustrates a user interface screen of an emoji sticker function according to various embodiments.

FIG. 12 illustrates a user interface screen of an emoji sticker function according to various embodiments.

Referring to FIG. 12, a processor (e.g., the processor 120 in FIG. 1 or the processor 210 in FIG. 2) of an electronic device 101, according to an embodiment, may combine (or merge) a facial expression emoji and a body emoji generated in an emoji edit mode for each body part (e.g., a facial expression edit mode, a body motion edit mode, a background edit mode, a text edit mode, and an effect edit mode) and further provide the same to an emoji home screen 6001.

The emoji home screen 6001 in FIG. 12 may include the avatar display area 610 for displaying the avatar 611 and the sticker list 630 of the emoji home screen 6001 in FIG. 6. Compared with FIG. 6, the emoji home screen 6001 in FIG. 12 may further include customized emoji stickers or sign language emoji stickers 1210 and 1220 generated by the user in addition to the sticker list 630 configured as a default. Hereinafter, the items described with reference to FIG. 6 will be omitted.

The electronic device 101, according to various embodiments, may generate emoji files for respective body parts when generating an emoji sticker, thereby using the same in respective edit modes, and combine the emojis for respective body parts generated in the respective edit modes to provide an environment capable of generating unique sticker emojis of the user.

Figure 13:
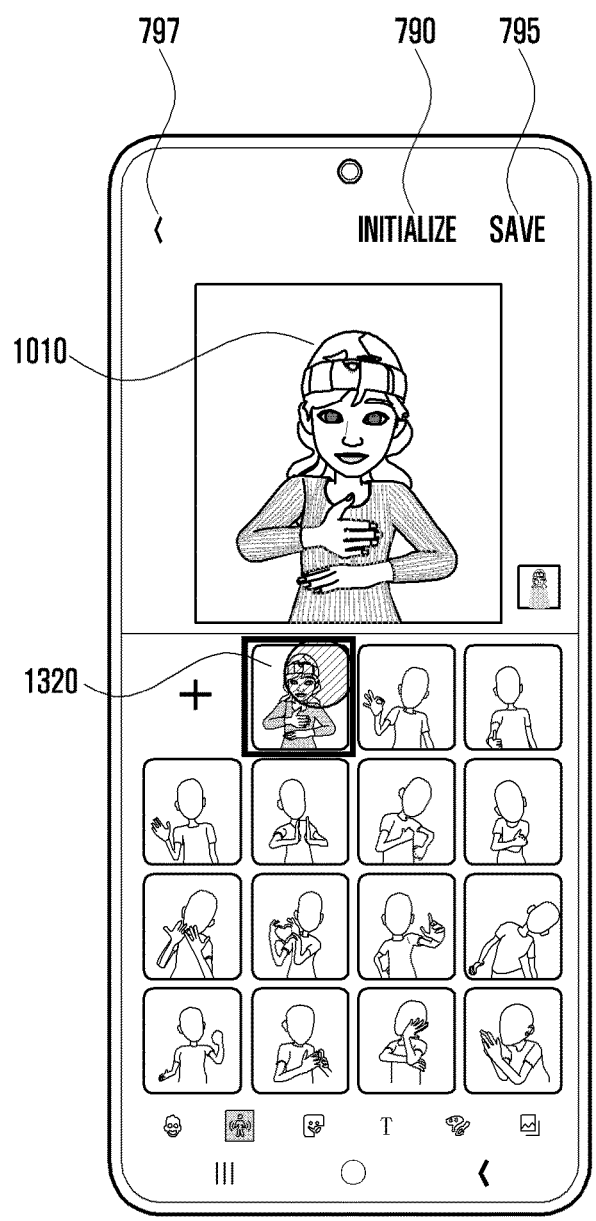
FIG. 13 illustrates a user interface screen supporting an emoji sticker function according to various embodiments.
Figure 13:
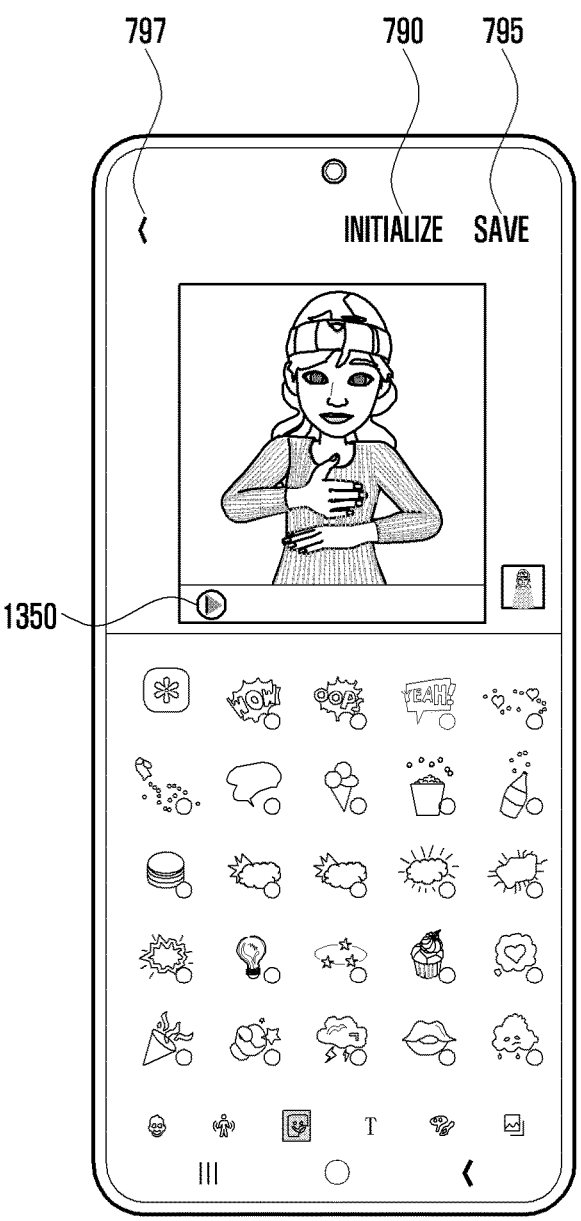

FIG. 13 illustrates a user interface screen supporting an emoji sticker function according to various embodiments.

Referring to FIG. 13, an electronic device 101, according to an embodiment, may support a service of entry into editing an emoji generated through an emoji list of each edit mode. For example, as shown in 1301, in a body motion edit mode of the electronic device 101, a customized body motion emoji 1320 reflecting features of user body motion may be generated according to a user request. In the body motion edit mode, the processor 120 or 210 may display an avatar 1310 performing hand motion, which is generated by applying the generated hand motion file to the avatar. Additionally, the processor 120 or 210 may display an initialization menu 1390, a save menu 1395, and a return menu 1397 for returning to the avatar home screen by including the same in the body mode edit screen.

The processor 120 or 210 may receive a touch gesture for long pressing of the generated customized hand motion emoji 1320. The processor 120 or 210 may switch to an edit mode capable of editing the selected emoji sticker as shown by 1302, based on the long-press input. For example, in the emoji edit mode, the processor 120 or 210 may display an item 1350 for adjusting the animation motion speed for the emoji sticker and a list (not shown) supporting a background and effect editing function on the display.

As used herein, the term "module" may include a unit implemented in hardware, software, or firmware, and may interchangeably be used with other terms, for example, "logic", "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The invention claimed is:

1. An electronic device comprising:
a camera;
a display;
a processor operably connected to the camera and the display; and
a memory operably connected to the processor,
wherein the memory stores instructions that cause, when executed, the processor to:
in response to an emoji function being executed, display a menu item supporting entry into an edit mode for one or more body parts, the menu item being included in at least a part of an emoji function user interface displayed on the display;

based on a user input requesting entry into a facial expression edit mode in the emoji function user interface, activate the camera to capture a user face image and generate a facial expression motion file from the user face image;

based on a user input requesting entry into a body motion edit mode in the emoji function user interface, activate the camera to capture a user body image and generate a body motion file from the user body image;

adjust sync for combining the generated facial expression motion file and body motion file; and generate a customized emoji sticker reflecting a user facial expression and a body motion by combining the sync-adjusted facial expression motion file and body motion file.

2. The electronic device of claim 1, wherein the instructions cause the processor to:

update an avatar related to the emoji function with a facial expression corresponding to the face motion file in response to generating the facial expression motion file; and update the avatar with a body motion corresponding to the body motion file in response to generating the body motion file.

3. The electronic device of claim 1, wherein the instructions cause the processor to apply the avatar updated with the face motion or body motion even in response to entering into an edit mode for each body part.

4. The electronic device of claim 1, wherein the instructions cause the processor to:

extract feature points of the user face from the user face image in case of entrance into the facial expression edit mode;

convert motion data of the user face to a morph target weight value representing the facial expression motion, based on the face feature points;

store the facial expression motion file in the memory, based on the morph target weight value; and display a customized facial expression emoji generated based on the facial expression motion file, the customized facial expression emoji being included in a facial expression set emoji list provided in response to entering into the facial expression edit mode.

5. The electronic device of claim 1, wherein the instructions cause the processor to:

identify joint parts of a user body by extracting feature points of the user body from the user body image in response to entering into the body motion edit mode;

convert body motion data to a translation rotation scale (TRS) value representing the body motion, based on the body joint parts;

store the body motion file in the memory, based on the TRS value; and display a customized body emoji generated based on the body motion file, the customized body emoji being included in a body motion set emoji list provided in case of entrance into the body motion edit mode.

6. The electronic device of claim 1, wherein the instructions cause the processor to display the generated customized emoji sticker by adding the same to an emoji sticker set list provided in an emoji home screen or emoji showroom mode.

7. The electronic device of claim 1, wherein the instructions cause the processor to adjust the number of frames of each file such that the number of frames of the facial expression motion file and the number of frames of the body motion file are the same.

8. The electronic device of claim 7, wherein the instructions cause the processor to:

calculate a number of first necessary frames for animation reproduction, based on the facial expression motion file;

calculate a number of second necessary frames for animation reproduction, based on the body motion file;

calculate a reference frame expressing a characteristic motion from the facial expression motion file and the body motion file; and adjust the number of frames by inserting a supplementary frame according to a number of necessary frames of each motion, based on the reference frame.

9. The electronic device of claim 1, further comprising a communication module, wherein the instructions cause the processor to transmit a body motion recognized from the user body image to an emoji server through the communication module and, in response to receiving a message or text information corresponding to the body motion from the emoji server, insert the received message or text information, as a background, into the customized emoji sticker.

10. The electronic device of claim 1, further comprising a communication module, wherein the instructions cause the processor to:

recognize a sign language pattern based on the body motion from the user body image and, in response to the sign language pattern being recognized, download a sign language emoji list through the communication module to display the sign language emoji list; and generate a sign language emoji sticker, based on an input of sequentially selecting at least one sign language image from the sign language emoji list.

11. A method of generating an emoji in an electronic device, the method comprising:

in response to an emoji function being executed in the electronic device, displaying an emoji function user interface supporting entry into an edit mode for a body part depicted in the emoji on a display;

receiving a user input requesting entry into a facial expression edit mode in the emoji function user interface;

activating a camera in the facial expression edit mode to capture a user face image and generating a facial expression motion file from the user face image;

performing control to display a customized facial expression emoji corresponding to the generated facial expression file on the emoji function user interface;

receiving a user input requesting entry into a body motion edit mode in the emoji function user interface;

activating the camera in the body motion edit mode to capture a user body image and generating a body motion file from the user body image;

performing control to display a customized body motion emoji corresponding to the generated body motion file on the emoji function user interface; and performing control to generate a customized emoji sticker reflecting a user facial expression and a body motion, based on a user input requesting a combination of the customized facial expression emoji and the customized body motion emoji and update the emoji function with the same.

12. The method of claim 11, wherein the performing control to update the emoji function further comprises:

updating, in response to a user input for selecting the customized face motion emoji, a face motion of the avatar related to the emoji function with the selected customized face motion emoji; and updating, in response to a user input for selecting the customized body motion emoji, a body motion of the avatar related to the emoji function with the selected customized body motion emoji.

13. The method of claim 11, wherein the performing control to display the customized facial expression emoji on the emoji function user interface further comprises:

extracting feature points of the user face from the user face image, converting motion data of the user face to a face morph target weight value representing the facial expression motion, based on the face feature points, storing the facial expression motion file in a memory, based on the morph target weight value; and performing control to display the customized facial expression emoji generated based on the facial expression motion file, the customized facial expression emoji being included in a facial expression set emoji list provided in case of entrance into the facial expression edit mode, and wherein the performing control to display the customized body motion emoji on the emoji function user interface further comprises:

identifying joint parts of a user body by extracting feature points of the user body from the user body image in response to entering into the body motion edit mode, converting body motion data to a translation rotation scale (TRS) value representing the body motion, based on the body joint parts, storing the body motion file in the memory, based on the TRS value; and displaying a customized body emoji generated based on the body motion file, the customized body emoji being included in a body motion set emoji list provided in response to entering into the body motion edit mode.

14. The method of claim 11, wherein the performing to update the emoji function further comprises synchronizing the facial expression motion file and the body motion file by adjusting the number of frames of each file such that the number of frames of the facial expression motion file and the number of frames of the body motion file are the same.

15. The method of claim 11, wherein the performing to update the emoji function further comprises:

calculating number of first necessary frames for animation reproduction, based on the facial expression motion file;

calculating number of second necessary frames for animation reproduction, based on the body motion file;

calculating a reference frame expressing a characteristic motion from the facial expression motion file and the body motion file; and adjusting the number of frames by inserting a supplementary frame according to a number of necessary frames of each motion, based on the reference frame to synchronize the facial expression motion file and the body motion file.

* * * * *